United States Patent
Kegasa et al.

(10) Patent No.: US 6,724,804 B1
(45) Date of Patent: Apr. 20, 2004

(54) FREQUENCY CONVERTER AND RADIO COMMUNICATIONS SYSTEM EMPLOYING THE SAME

(75) Inventors: Koyo Kegasa, Kobe (JP); Chitaka Manabe, Kobe (JP); Takuya Kusaka, Kobe (JP); Yuichiro Goto, Kobe (JP); Koji Inoue, Kobe (JP)

(73) Assignee: Kabushiki Kaisha Kobe Seiko Sho, Hyogo (JP)

( * ) Notice: Subject to any disclaimer, the term of this patent is extended or adjusted under 35 U.S.C. 154(b) by 0 days.

(21) Appl. No.: 09/350,997

(22) Filed: Jul. 12, 1999

(30) Foreign Application Priority Data

Jul. 13, 1998 (JP) .......................................... 10-197173

(51) Int. Cl.[7] ................................................ H04B 1/69
(52) U.S. Cl. ...................... 375/130; 375/153; 375/200; 375/295; 375/315; 375/316; 375/352; 455/73; 455/90
(58) Field of Search ............................... 375/130–153, 375/200, 295–315, 316–352; 455/73–90

(56) References Cited

U.S. PATENT DOCUMENTS

| 4,489,413 A | 12/1984 | Richmond et al. | ......... 370/278 |
| 5,036,523 A | * 7/1991 | Briskman | ............. 375/141 |
| 5,493,710 A | * 2/1996 | Takahara et al. | ......... 455/192.2 |
| 5,739,729 A | * 4/1998 | Tchamov et al. | ....... 331/117 R |
| 5,844,939 A | 12/1998 | Scherer et al. | ............. 375/219 |

* cited by examiner

Primary Examiner—Stephen Chin
Assistant Examiner—Guillermo Munoz
(74) Attorney, Agent, or Firm—Reed Smith LLP; Stanley P. Fisher, Esq.; Juan Carlos A. Marquez, Esq.

(57) ABSTRACT

In a frequency converter, a phase-locked loop generates a local-oscillation signal having a low frequency, of a plurality of local-oscillation signals having different frequencies, based on an intermediate frequency beacon signal that results from mixing a predetermined beacon signal with the local-oscillation frequency signal. Even if the phase-locked loop is used to generate the low frequency local-oscillation signal only, a frequency offset and a phase noise taking place in remaining high frequency local-oscillation signals are compensated for or canceled out. The frequency converter thus results in a high frequency accuracy. This arrangement reduces the number of bulky, costly and power-consuming phase-locked oscillators, typically used in the quasi millimeter band or the millimeter band. A simplified, compact frequency converter is thus provided, reducing both installation and operating costs.

22 Claims, 14 Drawing Sheets

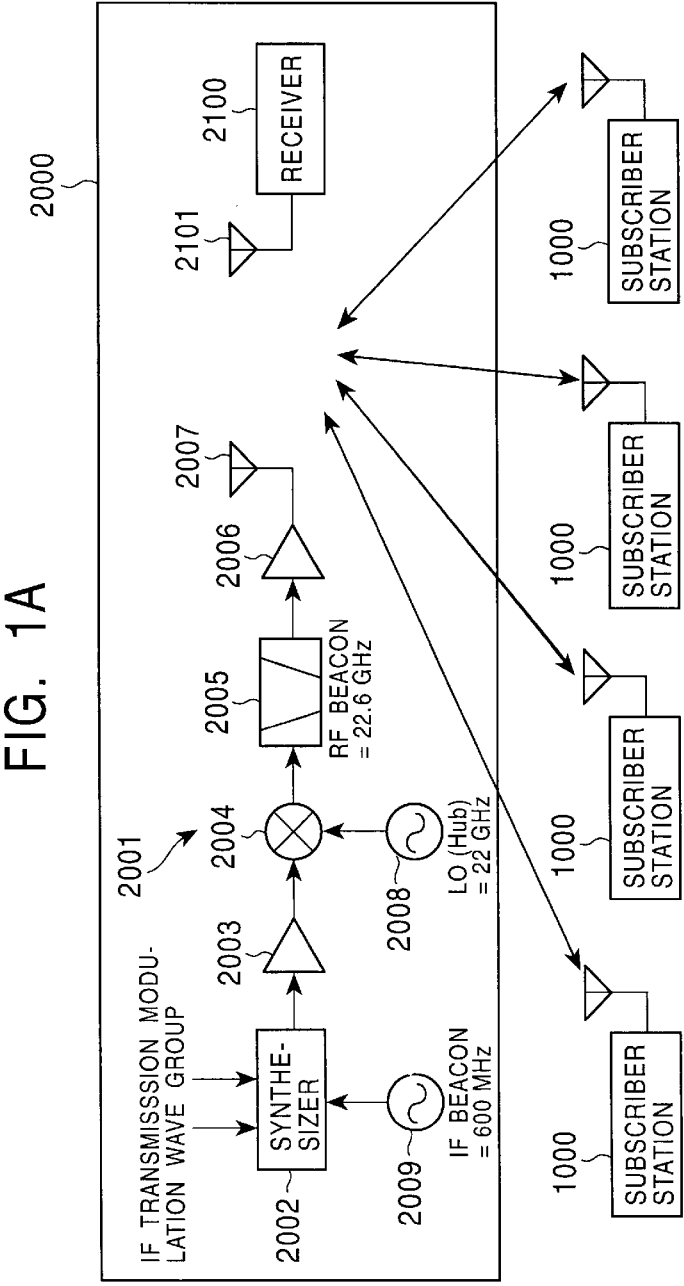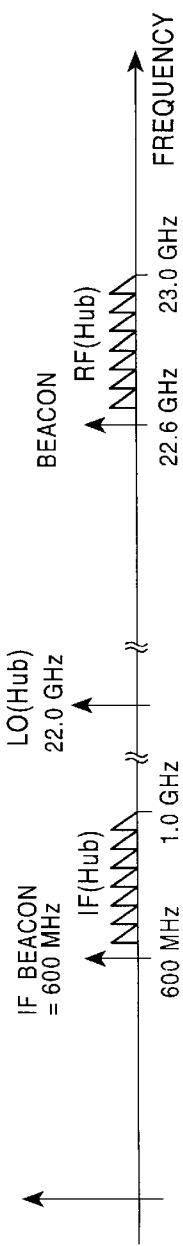

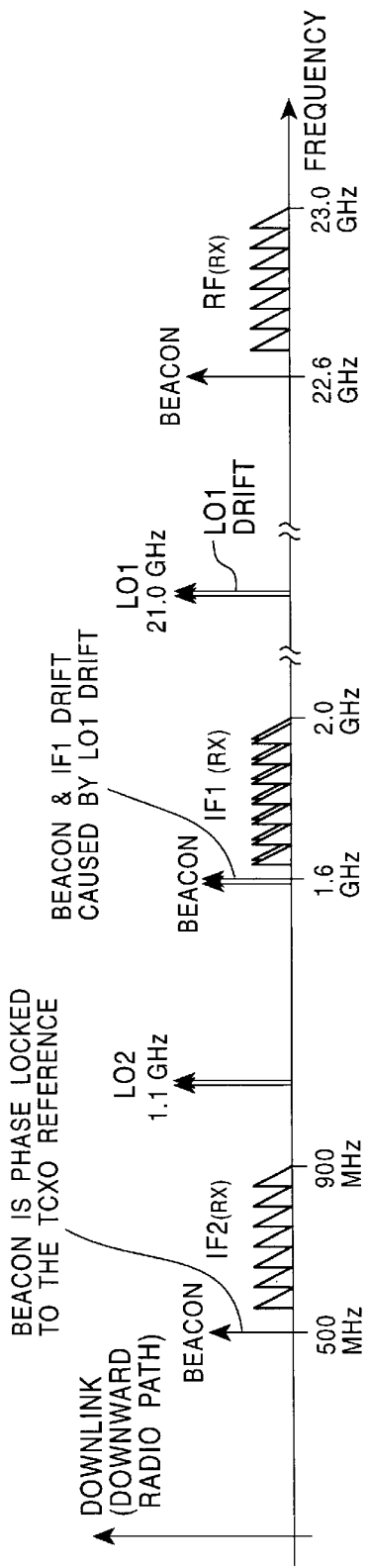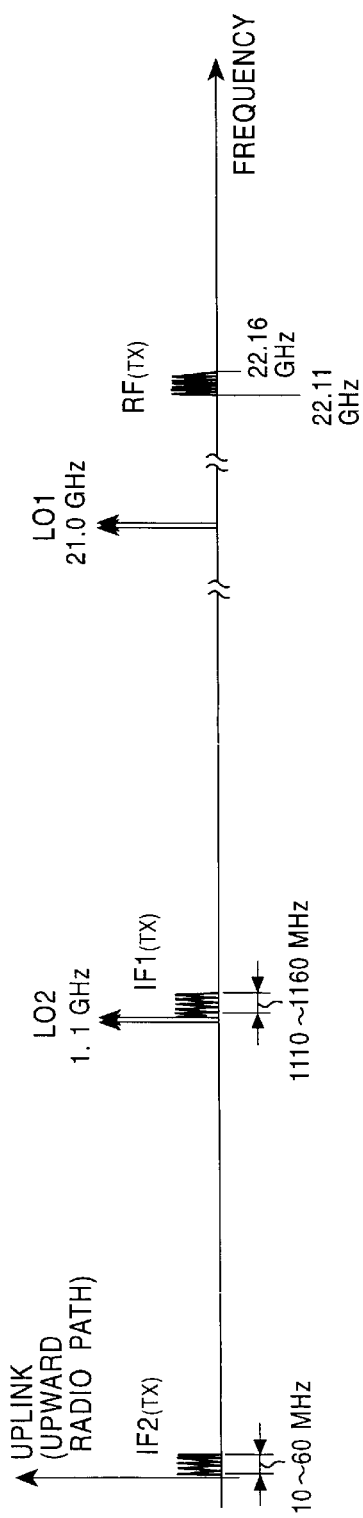

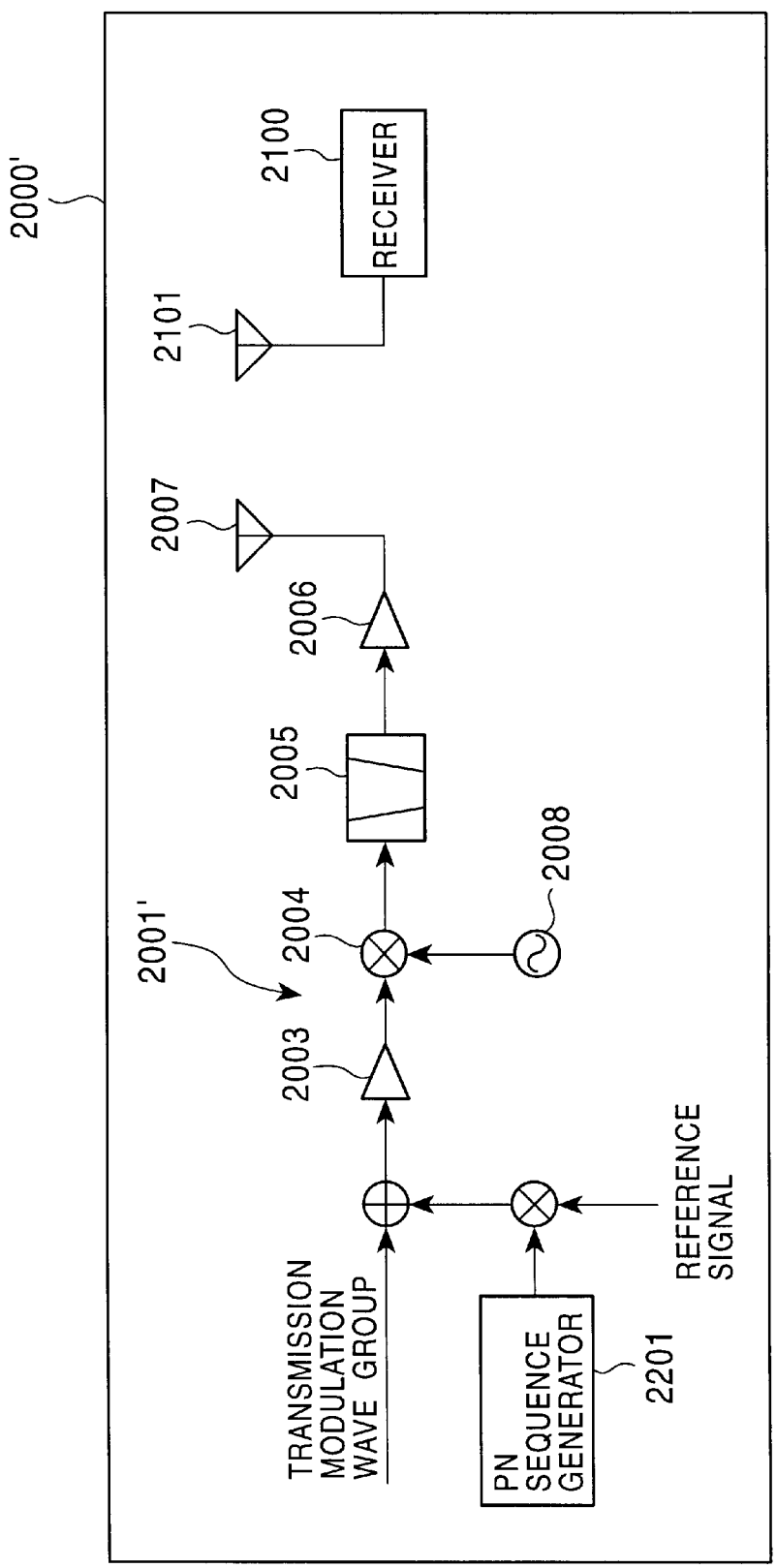

FREQUENCY CONVERTER AND RADIO COMMUNICATIONS SYSTEM EMPLOYING THE SAME

BACKGROUND OF THE INVENTION

1. Field of the Invention

The present invention relates to frequency converters and radio communications systems employing the frequency converter and, more particularly, to a frequency converter and a radio communication, in which a received radio frequency signal is converted into an intermediate frequency signal and an intermediate frequency signal to be transmitted is converted into a radio frequency signal.

2. Description of the Related Art

There is a growing demand for a high-speed network as data communications rapidly gain widespread use. High-speed communications provided by wired networks are still very expensive for individual users, and local radio communications networks providing a low-cost service are now actively studied and developed. Such a local radio network uses radio frequency bands, such as quasi millimeter waves (20 GHz–30 GHz) or millimeter waves (30 GHz–300 GHz), capable giving a high antenna gain with a small antenna. In the local radio network, a hub station, for example, installed in a telephone exchange station, provides high-speed two-way data communications service or local TV phone service to a plurality of (user) subscriber stations within a predetermined coverage area.

When radio communications are performed using radio frequency signals in the quasi millimeter band or the millimeter band, an intermediate frequency signal of several tens to several hundreds of megahertz, rather than radio frequency signals, is subjected to a receiving process including an isolation decoding step, a transmitting process including coding and synthesis steps, and an amplification of signals. The cost of a circuit arrangement required for the receiving and transmitting processes and the signal amplification is thus reduced. FIG. 16 shows a frequency converter, which converts a radio frequency signal into an intermediate frequency signal or an intermediate frequency signal into a radio frequency signal.

The frequency converter is installed in a subscriber station, for example, and receives radio waves, transmitted from a hub station, through its receiving antenna 1001. Out of the radio waves received by the receiving antenna 1001, radio frequency RF(RX) signals of interest for reception in a plurality of frequency channels in a range of 22.6 GHz–23.0 GHz are extracted by a bandpass filter 1002.

The radio frequency RF(RX) signal extracted through the bandpass filter 1002 is amplified to an appropriate level by a low noise amplifier 1003, and is then mixed with a TX/RX local oscillation frequency signal LO1, for example, a 21 GHz signal, by a mixer 1004.

The local oscillation frequency signal LO1 is generated by a phase-locked oscillator 1100.

The phase-locked oscillator 1100 includes a phase-locked loop including a counter circuit 1102, a frequency comparator 1103, a loop filter 1105, and a voltage-controlled oscillator 1106, and frequency multipliers 1107 and 1109.

In the phase-locked oscillator 1100, a signal output by the voltage-controlled oscillator 1106 is frequency-divided, for example, by 175, by the counter circuit 1102. The frequency comparator 1103 compares a signal output by the counter circuit 1102 to a reference signal, for example, a 10 MHz reference signal supplied by a reference oscillator 1204 employing a highly stable crystal oscillator. A voltage, corresponding to the difference between the two signals, is then amplified by the loop filter 1105 in appropriate frequency characteristics. The voltage output from the loop filter 1105 is fed back to a control input of the voltage-controlled oscillator 1106.

A 1.75 GHz signal output by the voltage-controlled oscillator 1106 is frequency-multiplied by four times by the frequency multiplier 1107, becoming a 7.0 GHz signal. The remaining signals contained in the output of the frequency multiplier 1107 are filtered out by a bandpass filter 1108.

The signal output by the bandpass filter 1108 is further frequency-multiplied by three times by the frequency multiplier 1109, becoming a 21.0 GHz signal. The remaining signals contained in the output of the frequency multiplier 1109 are filtered out by a bandpass filter 1110.

In this way, the phase-locked oscillator 1100 results in the signal having the local-oscillation frequency LO1 (21 GHz) at the same frequency accuracy level as that provided by the highly stable reference oscillator 1204.

The local-oscillation frequency signal LO1 is output by the bandpass filter 1110, and is amplified by an amplifier 1112, and is then received by the RX mixer 1004.

An output of the mixer 1004 contains the frequency components of the sum of, and the difference between, the radio frequency RF(RX) signal and the local-oscillation frequency LO1 signal. The difference between the two signals, i.e., a signal in an intermediate frequency band IF1(RX) of 1.6 GHz–2.0 GHz, is extracted by the bandpass filter 1005, is amplified by an amplifier 1006, and is fed to an RX mixer 1007.

The RX mixer 1007 mixes the signal in the intermediate frequency band IF1(RX) and a local-oscillation frequency LO2 signal, for example, a 1.1 GHz signal supplied by a phase-locked oscillator 1200.

The local-oscillation frequency LO2 signal is generated by the phase-locked oscillator 1200.

The phase-locked oscillator 1200 includes a phase-locked loop including a counter circuit 1202, a frequency comparator 1203, a loop filter 1205, and a voltage-controlled oscillator 1206, and the high-accuracy reference oscillator 1204 employing a crystal oscillator.

In the phase-locked oscillator 1200, a signal output by the voltage-controlled oscillator 1206 is frequency divided, for example, by 110, by the counter circuit 1102. The frequency comparator 1203 compares a signal output by the counter circuit 1202 to a reference signal, for example, a 10 MHz reference signal supplied by the reference oscillator 1204. A voltage, corresponding to the difference between the two signals, is then amplified by the loop filter 1205 in appropriate frequency characteristics. The voltage output from the loop filter 1205 is fed back to a control input of the voltage-controlled oscillator 1206.

In this way, the phase-locked oscillator 1200 results in the signal having the local-oscillation frequency LO2 (1100 MHz) at the same frequency accuracy level as that provided by the highly stable reference oscillator 1204.

The output of the RX mixer 1007 contains frequency components of the sum of, and the difference between, the signal in the intermediate frequency band IF1(RX) and the local-oscillation frequency LO2 signal. The difference between the two signals, i.e., a signal in an intermediate frequency band IF2(RX) of 500 MHz–900 MHz, is extracted through the bandpass filter 1008.

The signal in the intermediate frequency band IF2(RX), picked up by the bandpass filter 1008, is amplified by an amplifier 1009, is fed to a diplexer 1010, and is then fed to a demodulator (not shown) via an IF cable.

The signal in the radio frequency band RF(RX) thus received is converted into a signal in an appropriate intermediate frequency band IF2(RX).

The signal in the intermediate frequency band IF2(TX), for example, 10 MHz–60 MHz, supplied by a modulator (not shown), is received from the diplexer 1010 via the IF cable, is amplified by an amplifier 1012, and fed to a TX mixer 1013. The RX intermediate frequency IF2 (RX) and the TX intermediate frequency IF2(TX) are assigned in separate frequency ranges.

The TX mixer 1013 mixes the signal in the intermediate frequency band IF2(TX) with the signal having the local-oscillation frequency LO2 output by the phase-locked oscillator 1200.

The output of the TX mixer 1013 contains the signals of the sum of, and the difference between, the signal in the intermediate frequency band IF2(TX) and the local-oscillation frequency LO2 signal. The signal of the sum of the two signals, i.e., a signal in an intermediate frequency band IF1(TX) of 1.11 GHz–1.16 GHz, is extracted by a bandpass filter 1014.

The signal in the intermediate frequency band IF1(TX), extracted by the bandpass filter 1014, is amplified by an amplifier 1015, and is then fed to a TX mixer 1016.

The TX mixer 1016 mixes the signal in the intermediate frequency band IF1 (TX) with the signal in the local-oscillation frequency LO1 output by the phase-locked oscillator 1100.

The output of the TX mixer 1016 includes the signal components of the sum of, and the difference between, the signal in the intermediate frequency band IF1(TX) and the signal having the local-oscillation frequency LO1. The signal of the sum of the two signals, i.e., a signal in a radio frequency band RF(TX) of 22.11 GHz–22.16 GHz, is extracted by a bandpass filter 1017.

The signal in the radio frequency band RF(TX), extracted by the bandpass filter 1017, is amplified to an appropriate level, and is fed to a transmitting antenna 1019. The corresponding radio wave is then transmitted through the transmitting antenna 1019 to the hub station.

In this way, a signal in the appropriate intermediate frequency band IF2(TX) is frequency converted into a signal in the radio frequency band RF(RX) and is then transmitted.

The conventional frequency converter employs the phase-locked oscillators 1100 and 1200 to respectively generate a plurality of signals in the local-oscillation frequencies LO1 and LO2, shared by the transmitter part and the receiver part.

The phase-locked oscillators having a crystal oscillator working in the quasi millimeter band or the millimeter band are generally costly. They are complex and bulky, requiring a substantial maintenance cost, and consume much power, requiring a substantial operating cost. As a result, if the frequency converter is built in a subscriber station in a local radio network (a radio communications system), the cost of each individual subscriber's subscriber station increases much.

When the local-oscillation frequency is generated using the phase-locked oscillator, the frequency accuracy inevitably degrades in proportion to the ratio N of the frequency of the output signal to the frequency of the reference signal in the crystal oscillator, and a phase noise inevitably increases in proportion to the square of N. As the local-oscillation frequency becomes higher, the attained accuracy level of the output frequency and the level of the phase noise are limited more.

For example, when the frequency accuracy of the 10 MHz reference oscillator is +/−10 Hz (1E-6) and the phase noise is −120 dBc/Hz at an offset of 1 kHz, N=21 GHz/10 MHz=2100 at a frequency of 21 GHz. The attained frequency accuracy level is +/−21 kHz, and the phase noise level is −54 dBc/Hz at an offset of 1 kHz because 20 log 2100=66 dB.

If the local-oscillation frequency becomes higher, a frequency multiplier maybe required. The frequency multiplier can work as a source of unwanted radiated signals, degrading spurious characteristics of the frequency converter.

These degraded characteristics lead to a drop in the utilization of frequencies when communications are performed using frequency division multiplexing.

SUMMARY OF THE INVENTION

Accordingly, it is an object of the present invention to provide a frequency converter which results in an improved accuracy level of frequency and implements a compact and low-cost design by employing a phase-locked oscillator for a relatively low local-oscillation frequency only. It is also an object of the present invention to provide a radio communications system which results in an improved utilization of frequencies and lightens the cost imposed on a subscriber by incorporating the frequency converter.

To achieve the above object, a frequency converter of the present invention, in one aspect, converts a signal in a first frequency band to a signal in a second frequency band by successively mixing the signal in the first frequency band with a plurality of local-oscillation signals having different frequencies. The frequency converter includes a phase-locked loop, wherein the phase-locked loop generates a local-oscillation signal having a low frequency, of the plurality of local-oscillation signals, based on an intermediate frequency beacon signal, which is generated by mixing a predetermined radio frequency beacon signal with the local-oscillation signal.

The phase-locked loop generates the local-oscillation signal having the low frequency, of the plurality of local-oscillation signals, based on the intermediate frequency beacon signal, which is generated by mixing the predetermined radio frequency beacon signal with the local-oscillation frequency signal. Even if a frequency offset and a phase noise take place in a local-oscillation signal having a high frequency, of the plurality of local-oscillation signals, the frequency offset and the phase noise are compensated for or canceled out when the signal in the first frequency band is mixed with the local-oscillation signal having the low frequency. Specifically, even if the phase-locked loop is used in the frequency converter to generate the low local-oscillation frequency signal only, the frequency offset and the phase noise taking place in the remaining high frequency local-oscillation signals are compensated for or canceled out. A high frequency accuracy thus results. This arrangement reduces the number of bulky, costly and power-consuming phase-locked oscillators, typically used in the quasi millimeter band or the millimeter band. A simplified, compact frequency converter is thus provided, reducing both installation and operating costs. The overall frequency accuracy of the frequency converter, employing the phase-locked loop, is improved. Furthermore, since a frequency multiplier is dispensed with, the spurious characteristics of the frequency converter are improved.

In a preferred embodiment of the present invention, the phase-locked loop may generate the local-oscillation signal having the low frequency, of the plurality of local-oscillation signals so that a difference between the frequency of the intermediate frequency beacon signal and a predetermined reference frequency becomes zero.

In a preferred embodiment of the present invention, the phase-locked loop may generate the local-oscillation signal having the low frequency, of the plurality of local-oscillation signals so that the intermediate frequency beacon signal is synchronized with a signal having a predetermined frequency.

The phase-locked loop generates the local-oscillation signal having the low frequency, of the plurality of local-oscillation signals so that the intermediate frequency beacon signal is synchronized with the predetermined frequency signal. Even when a frequency offset and a phase noise take place in a signal local-oscillation having a high frequency, of the plurality of local-oscillation signals, the frequency offset and the phase noise are compensated for or canceled out when the signal in the first frequency band is mixed with the local-oscillation signal having the low frequency, of the plurality of local-oscillation signals.

In a preferred embodiment of the present invention, the phase-locked loop may synchronize the local-oscillation signal having the low frequency, of the plurality of local-oscillation signals, with the intermediate frequency beacon signal.

The phase-locked loop generates the local-oscillation signal having the low frequency, of the plurality of local-oscillation signals, in synchronization with the intermediate frequency beacon signal. Even when a frequency offset and a phase noise take place in a local-oscillation signal having a high frequency, of the plurality of local-oscillation signals, the frequency offset and the phase noise are compensated for or canceled out when the signal in the first frequency band is mixed with the local-oscillation signal having the low frequency, of the plurality of local-oscillation signals.

In a preferred embodiment of the present invention, the signal in the first frequency band may be a radio frequency signal while the signal in the second frequency band may be an intermediate frequency signal.

The construction of the receiver part of the frequency converter for converting the radio frequency signal into the intermediate frequency signal is simplified and is made compact. The installation cost and operating cost of the converter are thus reduced.

In a preferred embodiment of the present invention, the signal in the first frequency band may be an intermediate frequency signal while the signal in the second frequency band may be a radio frequency signal.

The construction of the transmitter part of the frequency converter for converting the intermediate frequency signal into the radio frequency signal is simplified and is made compact. The installation cost and operating cost of the converter are thus reduced.

A radio communications system of the present invention, in another aspect, includes a hub station and at least one subscriber station radio linked to the hub station. The subscriber station communicates with the hub station by converting a signal in a first frequency band to a signal in a second frequency band by successively mixing the signal in the first frequency band with a plurality of subscriber station local-oscillation signals having different frequencies. The hub station transmits, to the subscriber station, a beacon signal having a radio frequency that is generated by mixing a signal having a hub station local-oscillation frequency with a beacon signal having a predetermined hub station intermediate frequency. The subscriber station includes a phase-locked loop, wherein the phase-locked loop generates a local-oscillation signal having a low frequency, of the plurality of subscriber station local-oscillation signals used in the subscriber station, based on a subscriber station intermediate frequency beacon signal, which is generated by mixing a predetermined radio frequency beacon signal, transmitted from the hub station, with the subscriber station local-oscillation signal.

The hub station transmits, to the subscriber station, the radio frequency beacon signal into which the beacon signal having the hub station intermediate frequency and the signal having the hub station local-oscillation frequency are mixed. On the other hand, the subscriber station communicates with the hub station by successively mixing the signal in the first frequency band with the plurality of subscriber station local-oscillation signals having the different frequencies. The phase-locked loop generates a local-oscillation signal having a low frequency, of the plurality of local-oscillation signals, based on the intermediate frequency beacon signal, which is generated by mixing the predetermined radio frequency beacon signal with the local-oscillation frequency signal. Therefore, even when a frequency offset and a phase noise take place in a local-oscillation signal having a high frequency, of a plurality of local-oscillation signals, the frequency offset and the phase noise are compensated for or canceled out when the signal in the first frequency band is mixed with the local-oscillation signal having the low frequency. Specifically, even if the phase-locked loop is used in the frequency converter to generate the low local-oscillation frequency signal only, the frequency offset and the phase noise taking place in the remaining high frequency local-oscillation signals are compensated for or canceled out. A high frequency accuracy thus results. This arrangement reduces the number of bulky, costly and power-consuming phase-locked oscillators, typically used in the quasi millimeter band or the millimeter band. A simplified, compact frequency converter is thus provided, reducing both installation and operating costs and thereby lightening the burden on the subscriber. The overall frequency accuracy of the frequency converter, employing the phase-locked loop, is improved. Furthermore, since a frequency multiplier is dispensed with, the spurious characteristics of the frequency converter are improved.

In a preferred embodiment of the present invention, the phase-locked loop may generate the subscriber station local-oscillation signal having the low frequency, of the plurality of subscriber station local-oscillation signals so that a difference between the frequency of the subscriber station intermediate frequency beacon signal and a predetermined reference frequency becomes zero.

In a preferred embodiment of the present invention, the phase-locked loop may generate the subscriber station local-oscillation signal having the low frequency, of the plurality of subscriber station local-oscillation signals so that the subscriber station intermediate frequency beacon signal is synchronized with a signal having a predetermined frequency.

In the subscriber station, the phase-locked loop generates the subscriber station local-oscillation signal having the low frequency, of the plurality of subscriber station local-oscillation signals so that the subscriber station intermediate frequency beacon signal is synchronized with the predetermined frequency signal. Even when a frequency offset and a phase noise take place in a subscriber station local-oscillation signal having a high frequency, of the plurality of subscriber station local-oscillation signals, and in the signal in the hub station local-oscillation frequency, the frequency offset and the phase noise are compensated for or canceled out when the signal in the first frequency band is mixed with the subscriber station local-oscillation signal having the low frequency, of the plurality of local-oscillation frequency signals.

In a preferred embodiment of the present invention, the phase-locked loop may synchronize the subscriber station local-oscillation signal having the low frequency, of the plurality of subscriber station local-oscillation signals, with the subscriber station intermediate frequency beacon signal.

The phase-locked loop generates the subscriber station local-oscillation signal having the low frequency, of the plurality of subscriber station local-oscillation signals, in synchronization with the subscriber station intermediate frequency beacon signal. Even when a frequency offset and a phase noise take place in a subscriber station local-oscillation signal having a high frequency, of the plurality of subscriber station local-oscillation signals, the frequency offset and the phase noise are compensated for or canceled out when the signal in the first frequency band is mixed with the subscriber station local-oscillation signal having the low frequency, of the plurality of subscriber station local-oscillation signals.

In a preferred embodiment of the radio communications system of the present invention, the signal in the first frequency band may be a radio frequency signal while the signal in the second frequency band may be an intermediate frequency signal.

The construction of the receiver part of the subscriber station of the radio communications system for converting the radio frequency signal into the intermediate frequency signal is simplified and is made compact. The installation cost and operating cost of the radio communications system are reduced.

In a preferred embodiment of the radio communications system of the present invention, the signal in the first frequency band may be an intermediate frequency signal while the signal in the second frequency band may be a radio frequency signal.

The construction of the transmitter part of the subscriber station of the radio communications system for converting the intermediate frequency signal into the radio frequency signal is simplified and is made compact. The installation cost and operating cost of the radio communications system are reduced.

In a preferred embodiment of the present invention, a predetermined frequency range used by the hub station and the subscriber station is divided into a plurality of frequency channels.

Since the radio communications system employs the phase-locked loop for the low frequency local-oscillation signal only, the overall frequency accuracy of the system is improved and the utilization of frequencies is improved.

A frequency converter of the present invention, another aspect, converts a signal in a first frequency band to a signal in a second frequency band by successively mixing the signal in the first frequency band with a plurality of local-oscillation signals having different frequencies, wherein an intermediate frequency signal, into which a spread spectrum reference signal having a predetermined frequency and a local-oscillation frequency signal are mixed, is despread to result in a reference signal, and based on the resulting reference signal, a local-oscillation signal having a low frequency, of the plurality of local-oscillation signals having the different frequencies is generated.

In a preferred embodiment of the present invention, the frequency of the local-oscillation signal having the low frequency, of the plurality of local-oscillation signals, may be determined based on the level of the reference signal that is obtained by despreading the intermediate frequency signal.

In the frequency converter, the frequency of the local-oscillation signal having the low frequency, of the plurality of local-oscillation signals, is set based on the level of the reference signal that is obtained by despreading the intermediate frequency signal. When the reference signal is correctly despread, the reference signal obtained through the despreading process exceeds a predetermined threshold level. The intermediate frequency then is regarded as being coincident with the transmission frequency when the reference signal is spread. Even when a frequency offset and a phase noise take place in a subscriber station local-oscillation signal having a high frequency, of a plurality of local-oscillation frequency signals, the frequency offset and the phase noise are compensated for or canceled out, and a high accuracy level of frequency is achieved. Since the reference signal is overlapped in the same frequency band as that of data signal, through the spread spectrum modulation, with almost no effect incurred on the data signal, no band outside the frequency band for the data signal is consumed in a useless fashion, and generally limited frequency bands are efficiently utilized. Since there is no need for crystal oscillators or the like, a simple and compact design may be promoted further, and the installation and operating costs of the converter are reduced.

In a preferred embodiment of the present invention, the signal in the first frequency band may be a radio frequency signal while the signal in the second frequency band may be an intermediate frequency signal.

The construction of the receiver part of the frequency converter for converting the radio frequency signal into the intermediate frequency signal is simplified and is made compact. The installation cost and operating cost of the converter are reduced.

In a preferred embodiment of the present invention, the signal in the first frequency band may be an intermediate frequency signal while the signal in the second frequency band may be a radio frequency signal.

The construction of the transmitter part of the frequency converter for converting the intermediate frequency signal into the radio frequency signal is simplified and is made compact. The installation cost and operating cost of the converter are reduced.

A radio communications system of the present invention, in yet another aspect, includes a hub station and at least one subscriber station radio linked to the hub station, wherein the subscriber station communicates with the hub station by converting a signal in a first frequency band to a signal in a second frequency band by successively mixing the signal in the first frequency band with a plurality of subscriber station local-oscillation signals having different frequencies. The hub station transmits, to the subscriber station, a spread spectrum signal that is generated by spreading a predetermined reference signal and then by mixing a hub station local-oscillation frequency signal with the spread spectrum reference signal. A subscriber station local-oscillation signal having a low frequency, of the plurality of subscriber station local-oscillation signals used in the subscriber station, is generated from a reference signal that is obtained by despreading a subscriber station intermediate frequency signal which results from mixing the spread spectrum signal transmitted from the hub station and the subscriber station local-oscillation frequency signal.

In a preferred embodiment of the present invention, the frequency of the subscriber station local-oscillation signal having the low frequency, of the plurality of subscriber station local-oscillation signals, may be determined based on the level of the reference signal that is obtained by despreading the intermediate frequency signal.

In the radio communications system, the hub station transmits, to the subscriber station, the spread spectrum signal that is obtained by subjecting the predetermined reference signal to the spread spectrum process, and by mixing the spread spectrum reference signal with the hub station local-oscillation frequency signal. To communicate with the hub station, the subscriber station converts the signal in the first frequency band to the signal in the second frequency band, by successively mixing the signal in the first frequency band with the plurality of subscriber station local-oscillation signals having different frequencies. In the frequency conversion process, the subscriber station local-oscillation signal having the low frequency, of the plurality of subscriber station local-oscillation signals, is set in frequency so that the level of the reference signal that is obtained by despreading the subscriber station intermediate frequency signal exceeds a predetermined threshold. When the reference signal is correctly despread, the reference signal obtained through the despreading process exceeds the predetermined threshold level. The subscriber station intermediate frequency then is regarded as being coincident with the transmission frequency when the reference signal is spread. Even when a frequency offset and a phase noise take place in a subscriber station. local-oscillation signal having a high frequency, of a plurality of local-oscillation signals, the frequency offset and the phase noise are compensated for or canceled out, and a high accuracy level of frequency is achieved. Since the reference signal is overlapped in the same frequency band as that of data signal, through the spread spectrum modulation, with almost no effect incurred on the data signal, no band outside the frequency band for the data signal is consumed in a useless fashion, and generally limited frequency bands are efficiently utilized. Since there is no need for crystal oscillators or the like, a simple and compact design may be promoted further, and the installation and operating costs of the converter are reduced.

In a preferred embodiment of the present invention, the signal in the first frequency band may be a radio frequency signal while the signal in the second frequency band may be an intermediate frequency signal.

The construction of the receiver part of the radio communications system for converting the radio frequency signal into the intermediate frequency signal is simplified and is made compact. The installation cost and operating cost of the radio communications system are reduced.

In a preferred embodiment of the present invention, the signal in the first frequency band may be an intermediate frequency signal while the signal in the second frequency band may be a radio frequency signal.

The construction of the transmitter part of the radio communications system for converting the intermediate frequency signal into the radio frequency signal is simplified and is made compact. The installation cost and operating cost of the radio communications system are reduced.

In a preferred embodiment of the present invention, a predetermined frequency range used by the hub station and the subscriber station is divided into a plurality of frequency channels.

Since the radio communications system employs the phase-locked loop for the low local-oscillation frequency signal only, the overall frequency accuracy of the system is improved and the utilization of frequencies is improved.

BRIEF DESCRIPTION OF THE DRAWINGS

FIGS. 1A and 1B show an outline of a radio communications system and a frequency assignment for the system, according to one embodiment of the present invention;

FIGS. 3A and 3B are charts showing the frequency conversion carried out by the frequency converter;

FIG. 11 is a block diagram of a hub station in a radio communications system according to another embodiment;

DESCRIPTION OF THE PREFERRED EMBODIMENTS

Figure 2:
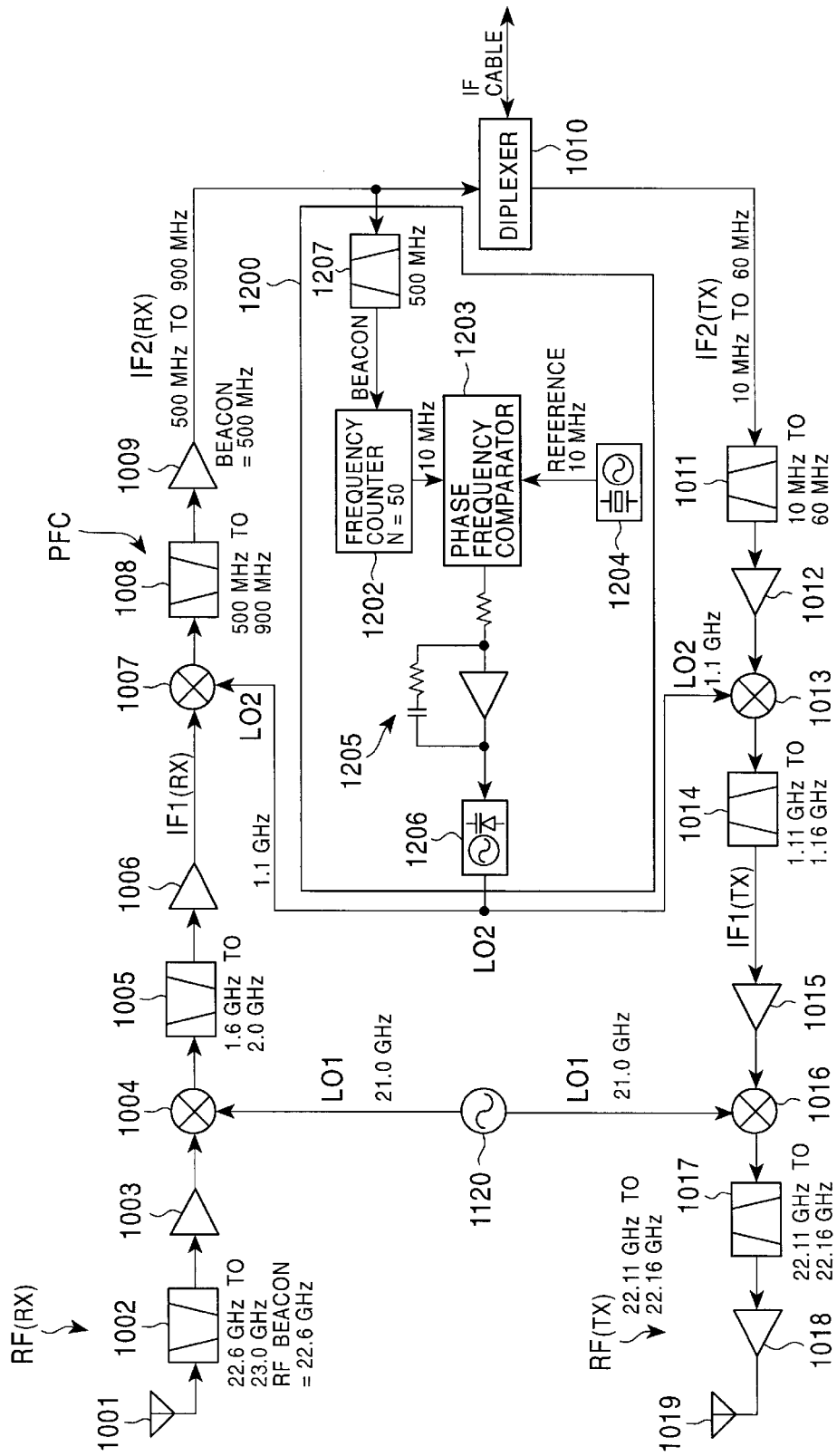
FIG. 2 is a block diagram showing a frequency converter of one embodiment of the present invention.
Figure 4:
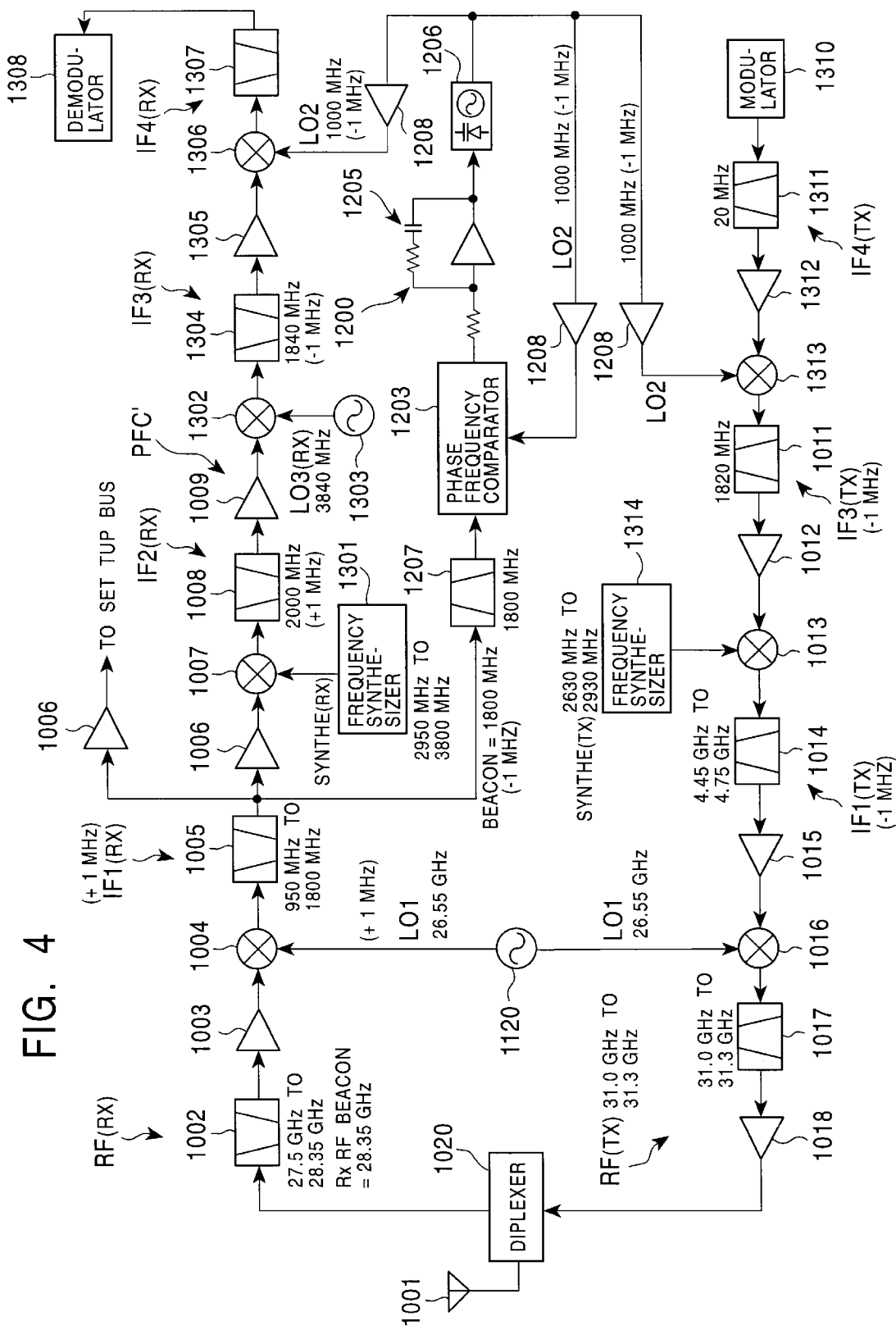
FIG. 4 is a block diagram of the frequency converter according to an alternate embodiment of the present invention.
Figure 5A:
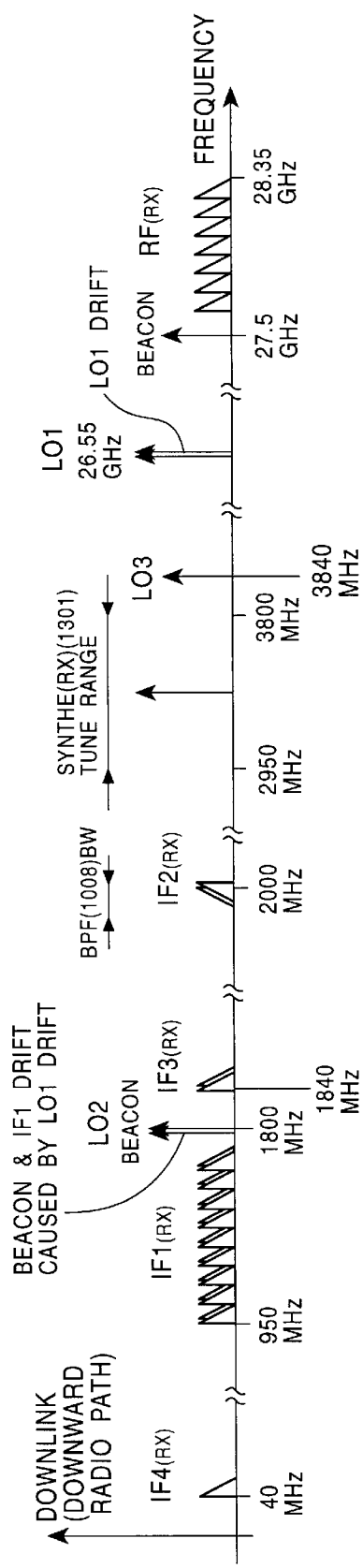
FIGS. 5A and 5B are charts showing the frequency conversion carried out by the frequency converter of the alternate embodiment.
Figure 5B:
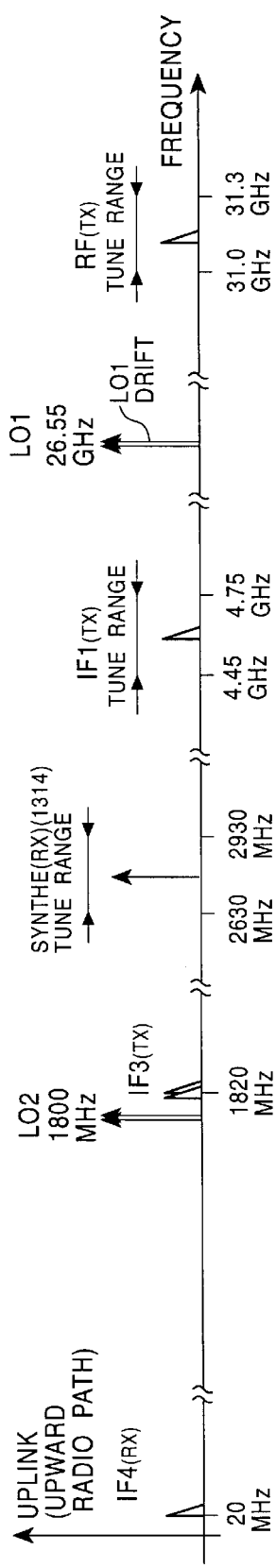
Figure 6C:
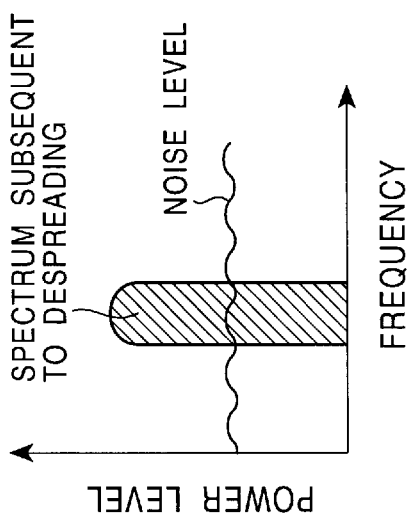
FIGS. 6A through 6C are spectrum charts of signals in a spread spectrum process.
Figure 6B:
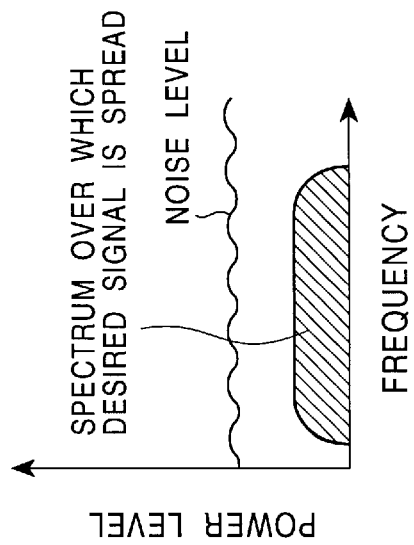
Figure 6A:
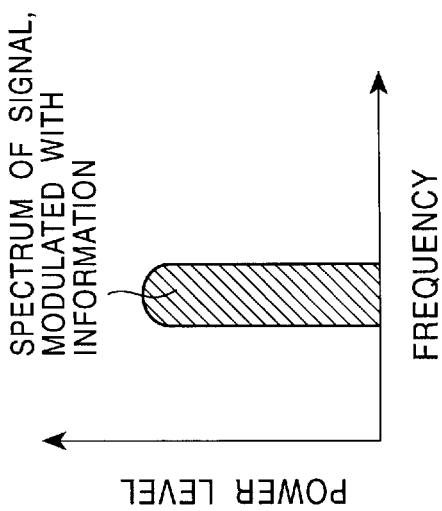
Figure 7:
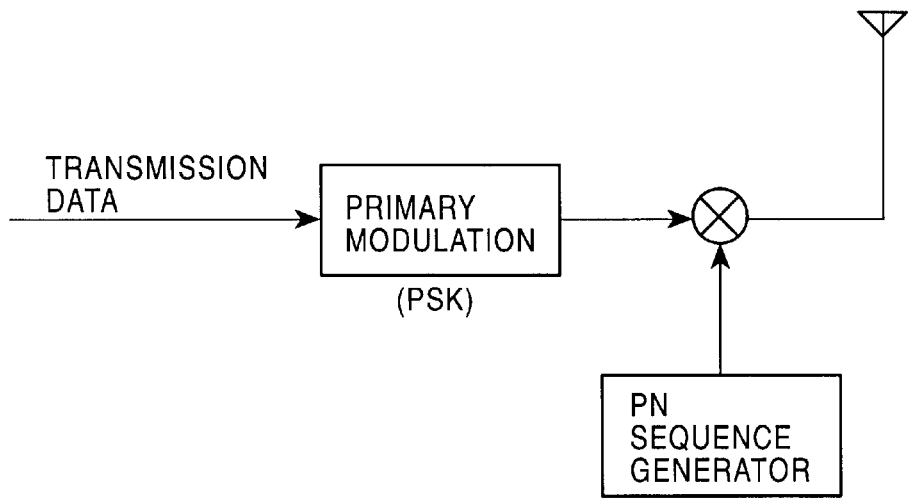
FIG. 7 is a block diagram roughly showing a transmitter performing the spread spectrum process.
Figure 8:
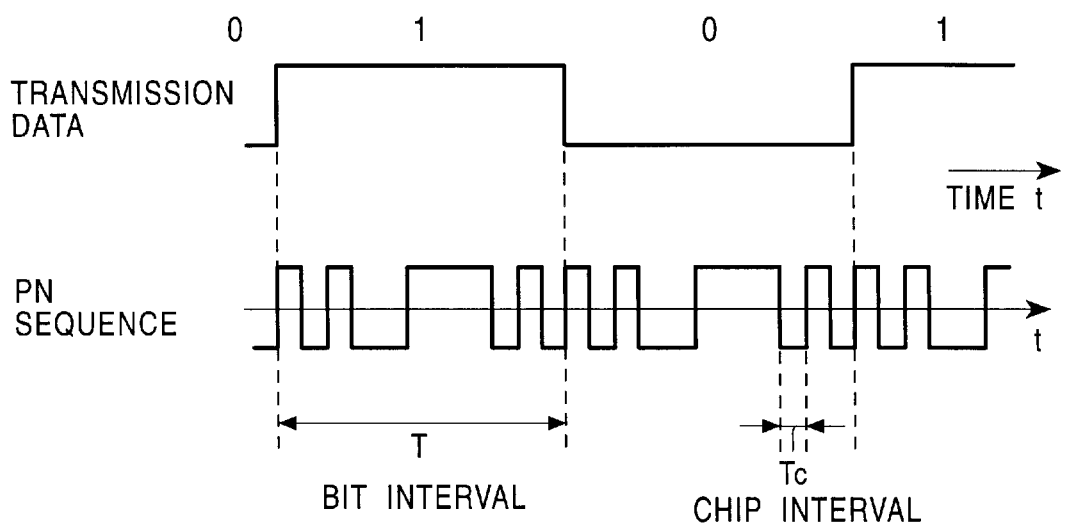
FIG. 8 is a timing diagram showing the relationship between a PN sequence and transmission data in the spread spectrum process.
Figure 9:
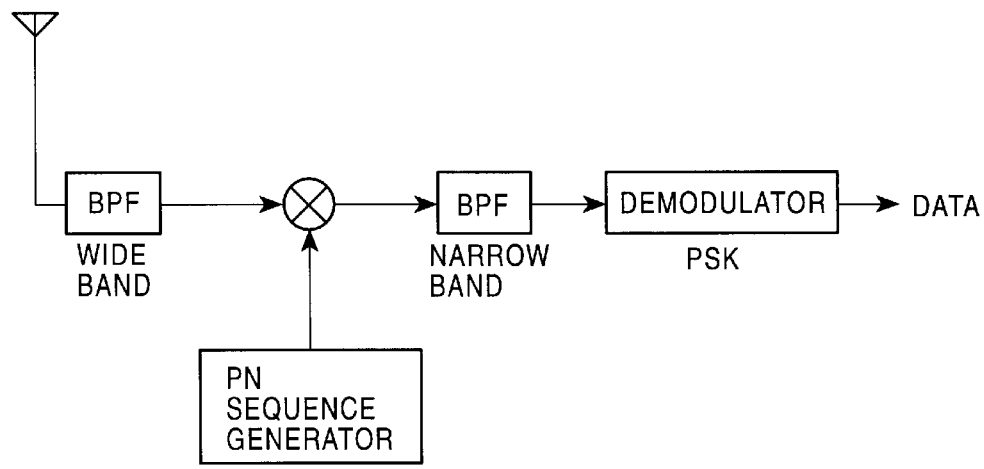
FIG. 9 is a block diagram roughly showing a receiver performing the spread spectrum process.
Figure 10A:
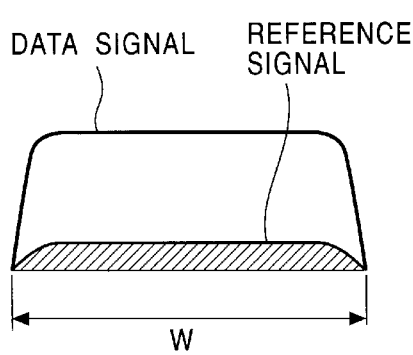
FIG. 10A shows a bandwidth of a data signal, over which a reference signal, shown in FIG. 10B, is spread.
Figure 10B:
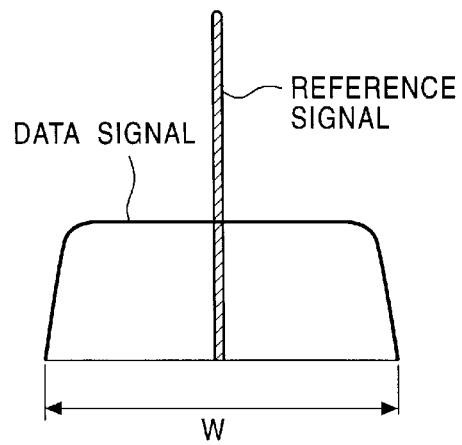
FIG. 10B shows the predetermined reference signal.
Figure 12:
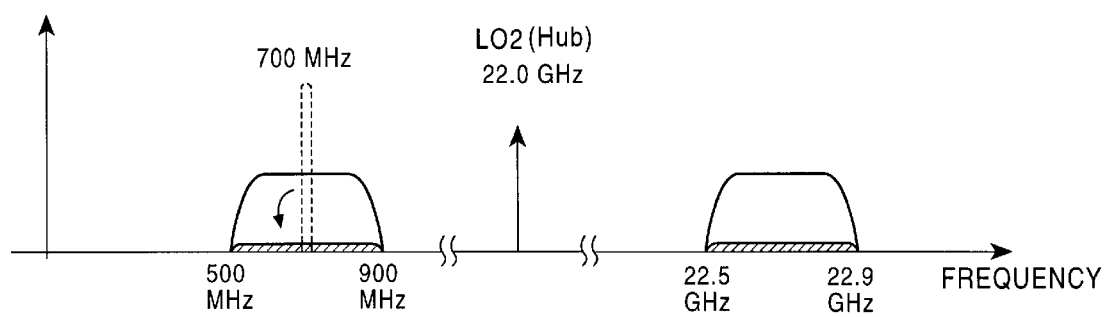
FIG. 12 is a frequency assignment chart for the hub station.
Figure 13:
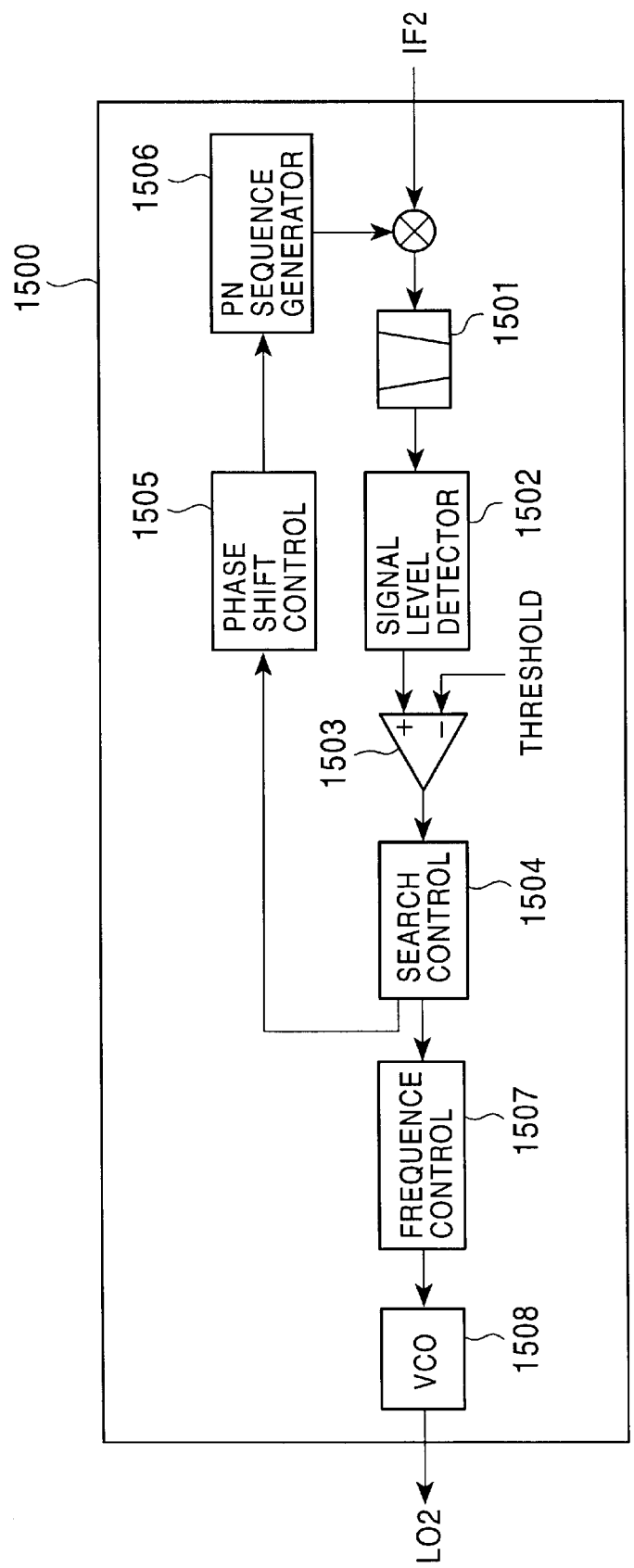
FIG. 13 is a block diagram of a local oscillator used in a frequency converter according to another embodiment.
Figure 14:
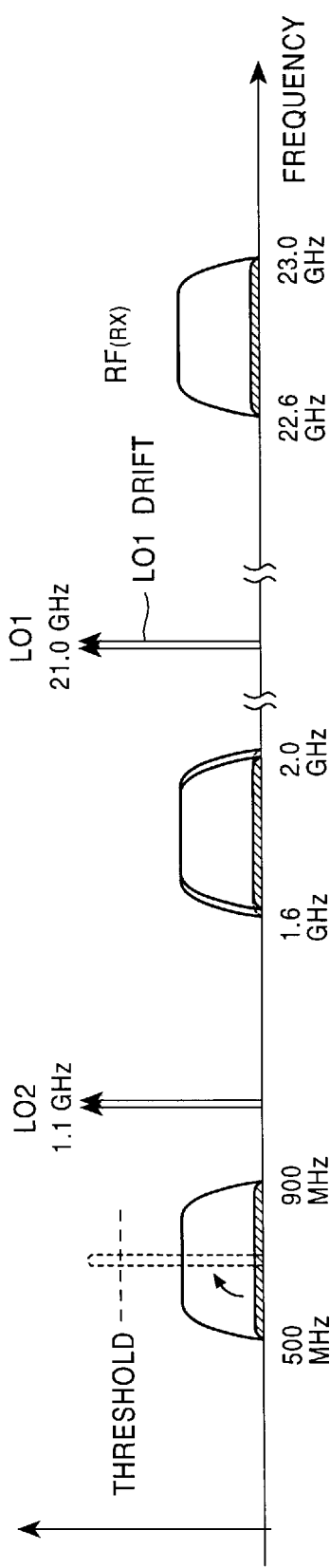
FIG. 14 is a frequency chart illustrating the frequency conversion of the frequency converter.
Figure 15A:
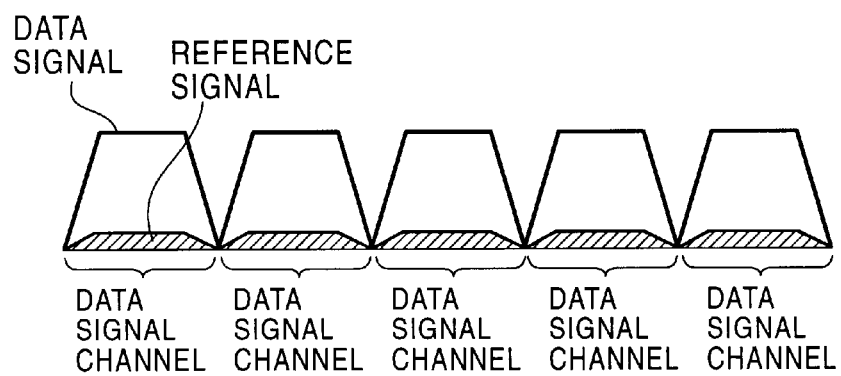
FIGS. 15A through 15C show how the reference signal is overlapped on the data signal.
Figure 15B:
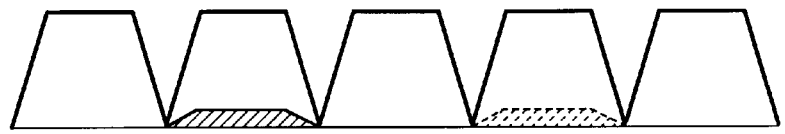
Figure 15C:
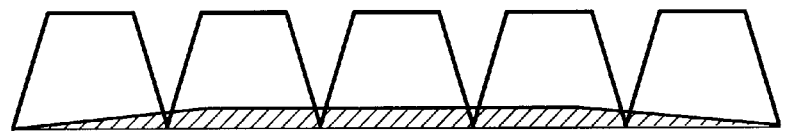
Figure 16:
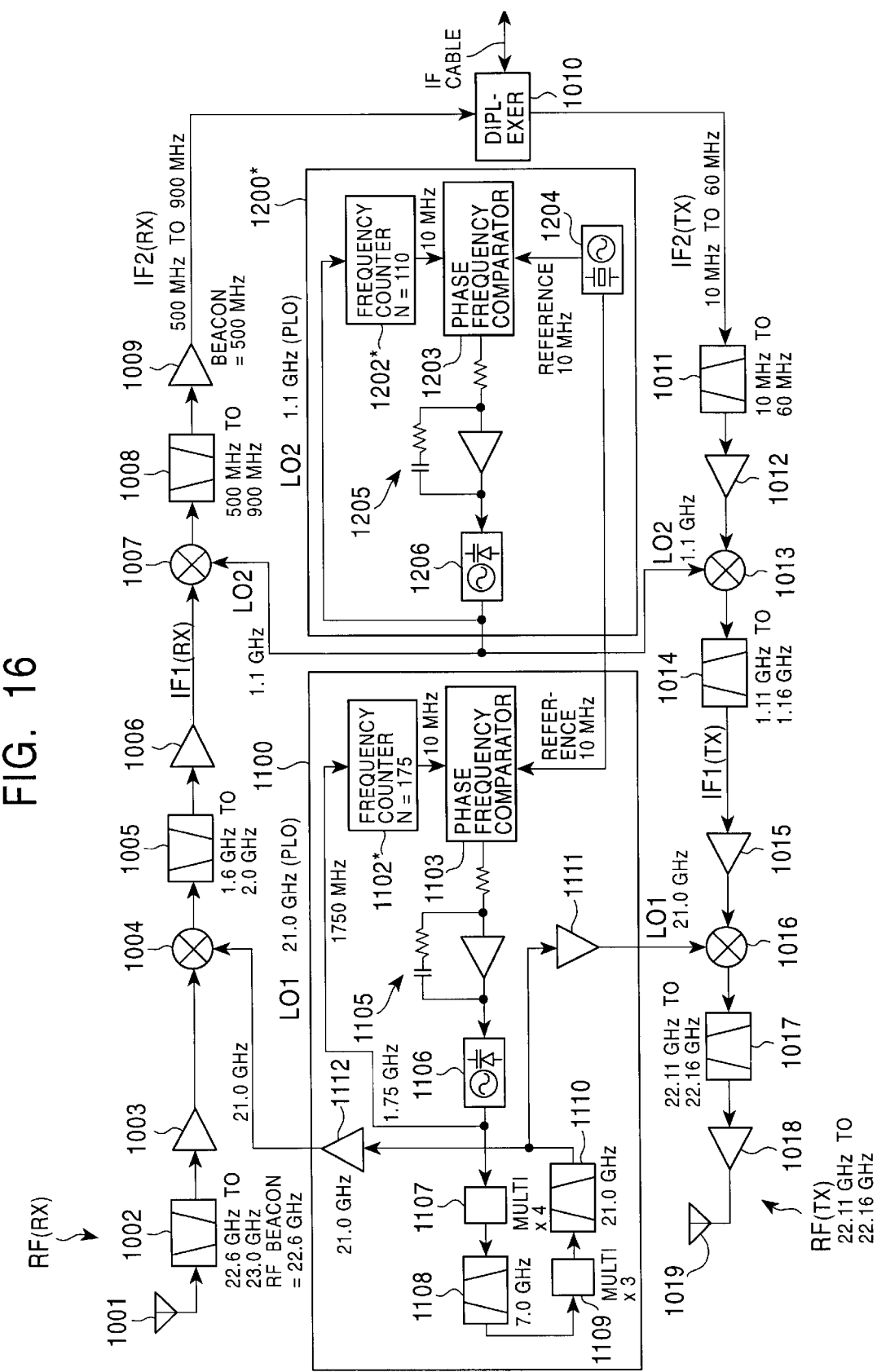
FIG. 16 is a block diagram of a conventional frequency converter.

The embodiments of the present invention are now discussed, referring to the drawings. The following embodiments of the present invention are exemplary and are not intended to limit the scope of the present invention. FIGS. 1A and 1B show an outline of a radio communications system and a frequency assignment for the system, according to one embodiment of the present invention. FIG. 2 is a block diagram showing a frequency converter of one embodiment of the present invention. FIGS. 3A and 3B are charts showing the frequency conversion carried out by the frequency converter. FIG. 4 is a block diagram of the frequency converter according to an alternate embodiment of the present invention. FIGS. 5A and 5B are charts showing the frequency conversion carried out by the frequency converter of the alternate embodiment. FIGS. 6A through 6C are spectrum charts of signals in a spread spectrum process. FIG. 7 is a block diagram roughly showing a transmitter performing the spread spectrum process. FIG. 8 is a timing diagram showing the relationship between a PN sequence and transmission data in the spread spectrum process. FIG. 9 is a block diagram roughly showing a receiver performing the spread spectrum process. FIG. 10A shows a bandwidth of a data signal, over which a reference signal, shown in FIG. 10B, is spread. FIG. 10B shows the predetermined reference signal. FIG. 11 is a block diagram of a hub station in a radio communications system according to another embodiment. FIG. 12 is a frequency assignment chart for the hub station. FIG. 13 is a block diagram of a local oscillator used in a frequency converter according to another embodiment. FIG. 14 is a frequency chart illustrating the frequency conversion of the frequency converter. FIGS. 15A through 15C show how the reference signal is overlapped on the data signal.

Referring to FIG. 1A, the radio communications system according to one embodiment of the present invention includes a hub station 2000 and at least one (user) subscriber station 1000, which are two-way radio-linked in a hub configuration using frequency channels in the quasi millimeter band and the millimeter band.

The hub station 2000 includes, in its transmitter 2001, a synthesizer 2002 for synthesizing intermediate frequency IF(Hub) transmission modulation wave group including a plurality of modulation waves that are modulated through 256 QAM (Quadrature Amplitude Modulation), an amplifier 2003 for amplifying the intermediate frequency IF(Hub) output from the synthesizer 2002, a mixer 2004 for generating a radio frequency RF(Hub) signal by mixing the intermediate frequency IF(Hub) signal output from the amplifier 2003 with a hub station local-oscillation frequency LO(Hub) signal, a bandpass filter 2005 for extracting the radio frequency RF(Hub) signal output from the mixer 2004, and a transmitter power amplifier 2006. The hub station 2000 transmits the radio frequency RF(Hub) signal to the subscriber station 1000 through its transmitting antenna 2007. The radio frequency signal from the subscriber station 1000 is received by a receiving antenna 2101, and is fed to a receiver 2100, but the detail about the reception operation is omitted here, and remains unchanged from that of a conventional communications system.

The feature of the hub station 2000 in the above radio communications system is that the transmitter 2001 includes a beacon signal oscillator 2009 for oscillating a beacon signal having a predetermined intermediate frequency IF(Hub). The beacon signal oscillated by the beacon signal oscillator 2009 is subjected to synthesis, together with the transmission modulation waves, in the synthesizer 2002, and is mixed with the hub station local-oscillation frequency LO(Hub) by the mixer 2004, becoming a radio frequency RF(Hub) beacon signal. The radio frequency RF(Hub) beacon signal is fed to the bandpass filter 2005 for filtering, then to the transmitter power amplifier 2006 for amplification, and is transmitted to the subscriber station 1000 through the transmitting antenna 2007.

FIG. 1B is a frequency assignment chart of the transmission modulation wave group and the beacon signal. For example, seven frequency channels, corresponding to the transmission modulation wave group, are evenly assigned in an intermediate frequency IF(Hub) range from 650 MHz to 1.0 GHz. An intermediate frequency IF(Hub), not interfering with the frequency channels, for example, 600 MHz, is assigned to the beacon signal. In this example, the beacon signal is the low end frequency of the intermediate frequency range IF(Hub) of 600 MHz to 1 GHz, as a transmission band. Alternatively, the high end frequency or an intermediate frequency of the transmission range can be assigned to the beacon signal. The signal in the range of 600 MHz to 1.0 GHz is amplified by the amplifier 2003, and is fed to the mixer 2004, where the signal is mixed with a 22.0 GHz local-oscillation frequency LO(Hub) signal. The signal at each frequency channel is thus converted to a radio frequency RF(Hub) signal in a range of 22.6 GHz to 23.0 GHz. The radio frequency RF(Hub) signal in the range of 22.6 GHz to 23.0 GHz output from the mixer 2004 is fed to the bandpass filter 2005, which filters out frequency components outside this range. The radio frequency RF(Hub) is amplified by the transmitter power amplifier 2006 to a sufficient level, and is then transmitted to the subscriber station 1000 by the transmitting antenna 2007.

The subscriber station 1000 is provided with a frequency converter PFC shown in FIG. 2.

As shown, in the frequency converter PFC, RX mixers 1004 and 1007, respectively, mix the radio frequency RF(RX) signal with subscriber station local-oscillation signals having different frequencies LO1 and LO2, and TX mixers 1013 and 1016, respectively, mix an intermediate frequency IF(TX) signal with the subscriber station local-oscillation signals having the different frequencies LO1 and LO2. The radio frequency RF(RX) signal is thus converted into the intermediate frequency IF(RX) signal, and the intermediate frequency IF(TX) signal is thus converted into the radio frequency RF(TX) signal. In this operation, the frequency converter PFC remains unchanged from the conventional frequency converter.

The frequency converter PFC is different from the conventional frequency converter in that the subscriber station local-oscillation signal having only the low frequency LO2, of the subscriber station local-oscillation frequencies LO1 and LO2, is generated by the phase-locked oscillator 1200 having a highly stable reference oscillator 1204. The phase-locked oscillator 1200 generates the subscriber station local-oscillation frequency LO2 signal so that the intermediate frequency signal IF2(RX) beacon signal is synchronized with a predetermined frequency signal output from the reference oscillator 1204. Here, the intermediate frequency signal IF2(RX) beacon signal results from mixing the radio frequency RF(RX) beacon signal with the signals having the subscriber station local-oscillation frequencies LO1 and LO2.

Referring to FIG. 1A through FIG. 3B, the radio communications system, particularly, the frequency converter PFC, is discussed in detail. FIGS. 3A and 3B are frequency charts illustrating the frequency conversion by the frequency converter.

In the radio communications system, the radio frequency signal in the range of 22.6 GHz to 23.0 GHz shown in FIG. 1B, transmitted from the hub station 2000, is received through the receiving antenna 1001 of the subscriber station 1000.

Out of the radio waves received through the receiving antenna 1001 of the subscriber station 1000, the signal having the radio frequency RF(RX) in the range of 22.6 GHz to 23.0 GHz is extracted by the bandpass filter 1002. As shown in FIG. 3A, the 22.6 GHz signal, out of the radio frequency RF(RX) signals, is the beacon signal, and serves as a reference when other frequency channel signals are converted. The radio frequency RF(RX) signals (containing the beacon signal), extracted by the bandpass filter 1002, are amplified to an appropriate amplitude by the low noise amplifier 1003, and are then mixed with the TX/RX local-oscillation frequency (subscriber station local-oscillation frequency) LO1 signal, for example, a 21.0 GHz signal, by the RX mixer 1004.

The local-oscillation frequency LO1 signal is generated by a local oscillator 1120 employing a dielectric oscillator or the like. The local oscillator 1120 employing a dielectric resonator gives a frequency accuracy of +/−1 MHz or so, and results in a high level phase noise in the vicinity of the carrier, compared with the phase-locked oscillator. For this reason, the local-oscillation frequency LO1 signal contains a frequency drift LO1 drift as large as 1 MHz (see FIG. 3A). The phase noise is the phenomenon in which the frequency of the output continuously varies in a random fashion at a relatively low frequency, and at a given moment, the phase noise is identical to a frequency offset.

The output of the RX mixer 1004 contains the frequency components of the sum of, and the difference between, the radio frequency RF(RX) signal and the local-oscillation frequency LO1 signal. The frequency component of the difference, i.e., the signal, in the intermediate frequency range of IF1(RX) of 1.6 GHz to 2.0 GHz, is extracted by the bandpass filter 1005, is amplified by the amplifier 1006, and is then fed to the RX mixer 1007.

The RX mixer 1007 mixes the signal in the intermediate frequency band IF1(RX) and the local-oscillation frequency LO2 signal, for example, a 1.1 GHz signal, supplied by the phase-locked oscillator 1200.

The output from the RX mixer 1007 contains the frequency components of the sum of, and the difference between, the intermediate frequency IF(RX) signal and the local-oscillation frequency LO2 signal. The frequency component of the difference between both signals, i.e., the signal in the intermediate frequency band IF2(RX) of 500 MHz to 900 MHz, is extracted by the bandpass filter 1008, is amplified by the amplifier 1009, and is then fed to the diplexer 1010 and the phase-locked oscillator 1200. The beacon signal contained in the intermediate frequency IF2(RX) is 500 MHz. The signal in the intermediate frequency band IF2(RX), fed to the diplexer 1010, is further fed to a demodulator (not shown) via an IF cable.

The intermediate frequency IF1 signal, fed to the RX mixer 1007, contains a frequency drift, as large as 1 MHz, derived from the local-oscillation frequency LO1 output from the local oscillator 1120, as shown in FIG. 3A.

In the frequency converter PFC and the radio communication system, of the present invention, the frequency drift is compensated for by the local-oscillation frequency LO2 signal output from the phase-locked oscillator 1200.

The phase-locked oscillator 1200 includes the phase-locked loop including the counter circuit 1202, frequency comparator 1203, loop filter 1205, and voltage-controlled oscillator 1206, and the reference oscillator 1204 having a high accuracy crystal oscillator or the like, and a bandpass filter 1207.

In the phase-locked oscillator 1200, the bandpass filter 1207 extracts the beacon signal, i.e., the low end frequency signal of 500 MHz from the intermediate frequency band IF2(RX).

The beacon signal of the intermediate frequency signal IF2(RX), output from the bandpass filter 1207, is frequency divided, for example, by 50, by the counter circuit 1202, thereby becoming a signal near 10 MHz. The frequency comparator 1203 compares the output from the counter circuit 1202 with the 10 MHz reference signal provided by the reference oscillator 1204. A voltage corresponding to the difference between the two signals is amplified by the loop filter 1205 in appropriate frequency characteristics. The voltage output from the loop filter 1205 is fed back to a control input of the voltage-controlled oscillator 1206.

The local-oscillation frequency LO2 is thus output from the phase-locked oscillator 1200 so that the frequency of the beacon signal becomes 500 MHz at the same frequency accuracy level as that of the reference oscillator 1204.

If the local-oscillation frequency LO1 becomes 1 MHz higher, the local-oscillation frequency output from the phase-locked oscillator 1200 is set to be 1 MHz lower, and the beacon signal is thus stabilized at 500 MHz at the frequency accuracy level of the reference oscillator 1204.

The phase-locked oscillator 1200 thus corrects not only the beacon signal but also the frequency drift in the intermediate frequency band IF2(RX), which occurs when the signal in the radio frequency band RF(RX) is mixed with the local-oscillation frequency LO1 signal. As a result, the frequency conversion is carried out in an extremely stable manner, and the phase noise is minimized.

For example, when the frequency accuracy of the 10-MHz reference oscillator is +/−10 Hz (1E-6) and the phase noise is −120 dBc/Hz at an offset of 1 kHz, N=1 GHz/10 MHz= 100 at an intermediate frequency of 1 GHz. The attained frequency accuracy level is +/−1 kHz, and the phase noise is as low as −80 dBc/Hz at an offset of 1 kHz because 20 log 100=40 dB. This frequency accuracy level is 1000 times better than that which is attained when a simple local oscillator 1120 (+/−1 MHz) having a dielectric resonator is employed to generate the local-oscillation frequency LO1 signal. Furthermore, this frequency accuracy level is 20 times better than that when the phase-locked oscillator 1100 along with the reference oscillator 1204 (+/−21 kHz) is employed to generate the local-oscillation frequency LO1 in the conventional art. With this level of frequency accuracy, this embodiment works with a high-end frequency modulation such as 256 QAM that features a narrow occupied frequency band and efficient frequency utilization.

In this way, the signal in the radiofrequency band RF(RX), transmitted from the hub station 2000 and received through the receiving antenna 1001 of the subscriber station 1000, is converted into the intermediate frequency IF2(RX) signal.

The local-oscillation frequency LO2, compensated for by the phase-locked oscillator 1200, is used not only in the receiver but also in the transmitter.

The signal in the intermediate frequency band IF2(TX) of 10 MHz to 60 MHz, shown in FIG. 3B, and fed from a modulator (not shown) via the IF cable, is fed to the amplifier 1012 for amplification through the diplexer 1010 and is then fed to the TX mixer 1013. Different frequency bands are assigned to the RX intermediate frequency band IF2(RX) and the TX intermediate frequency band IF2(TX).

The TX mixer 1013 mixes the signal in the intermediate frequency band IF2(TX) and the local-oscillation frequency LO2 signal output from the phase-locked oscillator 1200.

The output from the TX mixer 1013 contains the frequency components of the sum of, and the difference between, the signal in intermediate frequency band IF2(TX) and the local-oscillation frequency LO2 signal output from the phase-locked oscillator 1200. The signal of the sum, i.e., the signal in the intermediate frequency band IF1(TX) of 1.11 GHz to 1.16 GHz, is extracted by the bandpass filter 1014 as shown in FIG. 3B.

The signal in the intermediate frequency band IF1(TX), extracted by the bandpass filter 1014, is amplified by the amplifier 1015, and is fed to the TX mixer 1016.

The TX mixer 1016 mixes the signal in the intermediate frequency band IF1(TX) and a 21.0 GHz local-oscillation frequency signal LO1 output from the local oscillator 1120.

The output from the TX mixer 1016 contains the frequency components of sum of, and the difference between, the signal in the intermediate frequency band IF1(TX) and the local-oscillation frequency LO1 signal. The signal of the sum, i.e., the signal in the radio frequency band RF(TX) of 22.11 GHZ to 22.16 GHz is extracted by the bandpass filter 1017 as shown in FIG. 3B.

Since the local-oscillation frequency LO1 signal is generated by the local oscillator 1120, employing a dielectric resonator or the like, in the same manner as in the receiver, the 21.0 GHz local-oscillation frequency LO1 signal suffers from a frequency drift of 1 MHz or so. The local-oscillation frequency LO2, already mixed, varies in accordance with the frequency drift, and the frequency drift is thus compensated for when the local-oscillation frequency LO1 signal is mixed with the intermediate frequency IF1(TX) signal.

The radio frequency component RF(TX) signal, extracted by the bandpass filter 1017, is amplified to an appropriate level by a power amplifier 1018 and is then fed to the transmitting antenna 1019. From the transmitting antenna 1019, the radio frequency RF(TX) signal is transmitted.

In this way, the signal in the intermediate frequency band IF2(TX) is converted into the signal in the radio frequency band RF(TX), which is then transmitted to the hub station 2000. The hub station 2000 receives it through the receiving antenna 2101 of the receiver 2100.

If the output LO(Hub) of a local oscillator 2008 is used as the local-oscillation frequency of the frequency converter in the receiver 2100, a frequency drift taking place in the local oscillator 2008 is also canceled out on the same principle.

In the frequency converter and the radio communications system employing the frequency converter, the low frequency local-oscillation signal of the plurality of local-oscillation signals having different frequencies is generated by the phase-locked loop based on the intermediate frequency beacon signal resulting from mixing the predetermined radio frequency beacon signal with the local-oscillation frequency signal. Even if a frequency drift takes place in the high frequency local-oscillation signal of the plurality of subscriber station local-oscillation signals, the frequency drift and phase noise are compensated for or canceled out when the signal in the first frequency band is mixed with the low frequency local-oscillation signal of the plurality of local-oscillation signals. Specifically, even if the low local-oscillation frequency signal only is generated using the phase-locked loop in the frequency converter, the frequency offset and the phase noise taking place in the remaining high local-oscillation frequency signals are compensated for or canceled out. A high frequency accuracy thus results. This arrangement reduces the number of bulky, costly and power consuming phase-locked oscillators, typically used in the quasi millimeter band or the millimeter band. A simplified, compact frequency converter is thus provided, reducing both installation and operating costs. The overall frequency accuracy of the frequency converter, employing the phase-locked loop, is improved. Furthermore, since a frequency multiplier is dispensed with, the spurious characteristics of the frequency converter are improved.

Alternate Embodiment

In the above embodiment, the two local-oscillation frequencies LO1 and LO2 are used in the frequency conversion. The present invention is not limited to the two local-oscillation frequencies. The present invention can be applied to a frequency converter, which employs three or more local-oscillation frequencies.

FIG. 4 shows a frequency converter PFC' and a radio communications system employing the frequency converter PFC' in an alternate embodiment of the present invention.

As shown, RX mixers 1004 and 1007, respectively, mix the radio frequency RF(RX) signal with the signals having the local-oscillation frequencies LO1 and LO2, and TX mixers 1013 and 1016, respectively, mix an intermediate frequency IF4(TX) signal with the signals having the local-oscillation frequencies LO2 and LO1. The radio frequency RF(RX) signal is converted into the intermediate frequency IF4(RX) signal, and the intermediate frequency IF4(TX) signal is converted into the radio frequency RF(TX) signal. This method remains unchanged from the conventional art.

The frequency converter PFC' is different from the conventional art in that a phase-locked loop synchronizes the low frequency LO2 signal of the signals having the two local-oscillation frequencies LO1 and LO2, with a beacon signal contained in the signal in the intermediate frequency band IF1(RX) resulting from mixing the radio frequency RF(RX) signal and the local-oscillation frequency LO signal.

The frequency converter PFC' is now discussed, referring to FIG. 4 and FIGS. 5A and 5B. FIGS. 5A and 5B are frequency charts showing the frequency conversion performed by the frequency converter PFC'.

In the frequency converter PFC', a signal in a radio frequency band of 27.50 GHz to 28.35 GHz shown in FIG. 5A, transmitted from the hub station 2000, is received by the subscriber station 1000 through its receiving antenna 1001.

The radio wave received by the receiving antenna 1001 of the subscriber station 1000 is picked up by a diplexer 1020, and is fed to a bandpass filter 1002. The bandpass filter 1002 extracts a signal in a radio frequency band RF(RX) of 27.50 GHz to 28.35 GHz, which is of interest for reception among received signals. A 27.50 GHz signal of the radio frequency RF(RX) signals is a beacon signal, and serves as a reference when other frequency channel signals are converted. The radio frequency RF(RX) signals (containing the beacon signal), extracted by the bandpass filter 1002, are amplified to an appropriate amplitude by the low-noise amplifier 1003, and are then mixed with the TX/RX local-oscillation frequency LO1 signal, for example, a 26.55 GHZ signal, by the RX mixer 1004.

The local-oscillation frequency LO1 signal is generated by the local oscillator 1120 employing a dielectric oscillator or the like. The local oscillator 1120 employing a dielectric resonator gives a frequency accuracy of +/−1 MHz or so, and results in a high level phase noise in the vicinity of the carrier, compared with the phase-locked oscillator. For this reason, the local-oscillation frequency LO1 signal contains a frequency drift LO1 drift as large as 1 MHz (see FIG. 5A).

The output of the RX mixer 1004 contains the frequency components of the sum of, and the difference between, the radio frequency RF(RX) signal and the local-oscillation frequency LO1 signal. The frequency component of the difference, i.e., the signal, in the intermediate frequency band IF1(RX) of 950 MHz to 1800 MHz, is extracted by the bandpass filter 1005, is then amplified by the amplifier 1006, and is then fed to the RX mixer 1007 and the bandpass filter 1207.

The RX mixer 1007 mixes the signal in the intermediate frequency band IF1(RX) and a signal Synthe(RX) in a frequency range of 2950 MHz to 3800 MHz, supplied by a frequency synthesizer 1301.

The output of the RX mixer 1007 contains the frequency components of the sum of, and the difference between, a signal in the intermediate frequency band IF(RX) and the Synthe(RX) signal. The frequency component of the difference, i.e., a 2000 MHz intermediate frequency IF2 (RX) signal, is extracted by the bandpass filter 1008 according to its passband characteristics. The signal, corresponding to a single channel, is thus selected. The output of the bandpass filter 1008 is fed to an RX mixer 1302 after being amplified by the amplifier 1009.

The RX mixer 1302 mixes the output of the amplifier 1009, i.e., the 2000 MHz intermediate frequency IF2(RX) signal and a 3840-MHz local-oscillation frequency LO3 (RX) signal that is higher in frequency than the Synthe(RX) signal.

The output of the RX mixer 1302 contains the frequency components of the sum of, and the difference between the signal in the intermediate frequency band IF2(RX) and the local-oscillation frequency LO3(RX) signal. The frequency component of the difference, i.e., a 1840-MHz intermediate frequency IF3(RX) signal, is extracted by a bandpass filter 1304, is amplified by a bandpass filter 1305, and is then fed to an RX mixer 1306.

The RX mixer 1306 mixes the signal in the intermediate frequency band IF3(RX) and a local-oscillation frequency LO2 signal having a frequency of 1000 MHz or so. The local-oscillation frequency LO2 signal is supplied, through an amplifier 1208, by a voltage-controlled oscillator 1206 included in the phase-locked oscillator 1200.

The frequency converter PFC' cancels out a frequency drift of about 1 MHz in the signal in the intermediate frequency band IF3(RX), attributed to the local-oscillation frequency LO1, by mixing the local-oscillation frequency LO2 signal with the signal in the intermediate frequency band IF3(RX).

The frequency drift is canceled when the phase-locked oscillator 1200 synchronizes the local-oscillation frequency LO2 signal to the beacon signal contained in the signal in the intermediate frequency band IF1(RX).

The beacon signal contained in the signal in the intermediate frequency band IF1(RX) is extracted by the bandpass filter 1207 in the phase-locked oscillator 1200. The frequency of the beacon signal contained in the signal in the intermediate frequency band IF1(RX) is a high end frequency of the intermediate frequency band IF1(RX), namely, 1800 MHz. A frequency comparator 1203 compares the 1800 MHz beacon signal, extracted by the bandpass filter 1207, to the local-oscillation frequency LO2 signal output from the voltage-controlled oscillator 1206. A voltage corresponding to the difference between the two signals is amplified by a loop filter 1205 according to appropriate frequency characteristics. The voltage output from the loop filter 1205 is fed back to a control input of the voltage-controlled oscillator 1206.

In this way, the local-oscillation frequency LO2 varies, tacking the frequency drift taking place in the beacon signal. If the local-oscillation frequency LO1 signal changes, becoming high in frequency by 1 MHz, the local-oscillation frequency LO2 output from the phase-locked oscillator 1200 drops by 1 MHz, thereby canceling the frequency drift.

A signal, for example, a 40 MHz channel signal in an intermediate frequency band IF4(RX), output by the RX mixer 1007 and extracted by a bandpass filter 1307, is free from the effect of the frequency drift. The signal in the intermediate frequency band IF4(RX) is sent to a demodulator 1038 for demodulation.

A modulated signal in the intermediate frequency band IF4(TX), output from a modulator 1310, is converted into a modulated signal in a radio frequency band RF(TX) of 31.0 GHz to 31.3 GHz with a frequency drift similarly canceled out, as shown in FIG. 5B. The modulated signal is fed to the diplexer 1020, and is then transmitted through the antenna 1001.

In the frequency converter PFC' and the radio communications system employing the frequency converter PFC', the subscriber station local-oscillation signal having the low frequency, of the local-oscillation signals having different frequencies is generated in synchronization with the intermediate frequency beacon signal. Even if a frequency drift takes place in the high frequency local-oscillation signal of the plurality of subscriber station local-oscillation signals, the frequency drift and phase noise are compensated for or canceled out when the signal in the first frequency band is mixed with the low frequency local-oscillation signal, of the plurality of local-oscillation signals.

Other Alternative Embodiments

In each of the above embodiments, the beacon signal and the transmission modulation wave group need to be set in different frequency bands to facilitate separating the beacon signal from the transmission modulation wave group. The frequency band available for the transmission modulation wave group is narrowed by a portion of the frequency band occupied by the beacon signal. In view of the utilization of frequencies only, the conventional art has an advantage over the above embodiments.

The inventors of this invention have developed a frequency converter and a radio communications system employing the frequency converter, which give the advantages as good as those of the preceding embodiments in terms of bandwidth without occupying an extra frequency band other than the frequency band originally assigned to the transmission modulation wave group.

The spread spectrum modulation is a useful means that enables a signal to be contained in the same frequency band used for the transmission modulation wave group. The concept of the spread spectrum modulation is briefly discussed here.

In the spread spectrum modulation, a frequency spectrum of a signal to be transmitted is spread over along a frequency axis using another signal (a code) having a frequency spectrum substantially wider than that of the signal to be transmitted. The signal is thus transmitted using a frequency bandwidth much wider than the frequency bandwidth it originally needs. FIGS. 6A, 6B and 6C are spectrum charts of a signal in the spread spectrum modulation. A signal modulated with information, shown in FIG. 6A, is spread using a predetermined code. FIG. 6B shows a resulting spread spectrum signal having a wider frequency spectrum. This spread spectrum signal is transmitted. The spread spectrum signal, shown in FIG. 6B, has an extremely low level of power spectrum density and exerts no effect on other signals. In a receiver, the received signal shown in FIG. 6B is despread using a predetermined code (the same code used in the spread spectrum modulation), and is thus demodulated (as shown in FIG. 6C). The spread spectrum signal (FIG. 6B) only is restored to its original signal, shown in FIG. 6A, and other signals do not affect the restored signal.

FIG. 7 and FIG. 9 are simplified block diagrams of a transmitter and a receiver, employing the spread spectrum technique. The transmitter and the receiver shown here are not the examples in which the present invention is implemented, and are cited for the discussion purpose of the concept of the spread spectrum technique.

In the transmitter shown in FIG. 7, transmission data (shown in FIG. 6A, for example), already subjected to a primary modulation (phase-shift keying modulation in FIG. 7), is multiplied by a PN (pseudorandom noise) sequence (corresponding to the above-cited code). The transmission data is thus spread over a wider spectrum and is then transmitted. The PN sequence is a sequence of rectangular waves randomly taking +1 or −1 as shown in FIG. 8. The data rate (Tc in FIG. 8) of the randomly changing rectangular wave PN sequence is set to be substantially faster than the data rate (T in FIG. 8) of the primary modulated signal (i.e., T>>Tc). Here, T/Tc is called a spreading ratio. The spreading ratio varies depending on applications, but generally falls within a range of 10 to 10000.

In the receiver shown in FIG. 9, the signal (i.e., the signal shown in FIG. 6B), received from the transmitter, is fed to a bandpass filter which removes unwanted frequency components contained in the signal. The signal is then multiplied by the PN sequence for despreading. The signal is thus demodulated back to the original primary modulation signal (i.e., the signal shown in FIG. 6C). Only when the PN sequences are aligned and timings (i.e., phases of the received signal and the PN sequence) coincide, the signal is demodulated. The demodulated signal passes a narrow bandpass filter matching the band of the primary modulation signal, and is then fed to an ordinary demodulator circuit.

From the above discussion, the spread spectrum technique has the following advantage. Since the original signal is spread over a frequency band that is a spreading ratio times the original frequency bandwidth, the power spectrum density is the inverse of the spreading ratio. The spread spectrum signal exerts almost no effect on other signals. The signal is then despread using the same code that is used for spreading, thus demodulated back to the original signal; and other signals contained do not affect the demodulation. In other words, a signal contained in a narrow band is spread in the course of the despreading process of a signal of interest, thereby having a low power density. The signal, which is spread like thermal noise, has no correlation with the spreading code, and thus remains unchanged in the despreading process.

The use of the spread spectrum having the above advantage permits a reference signal to be included in the same frequency band as that of data signal. FIG. 10A shows the spectrum of a transmission signal at a given channel. The data signal has a bandwidth W determined by its data rate. The data signal is typically scrambled so that it may spread over the bandwidth rather than being biased. A transmission signal is produced by overlapping, on the data signal, a reference signal which is spread using a spreading code different from the code that was used to scramble the data signal. When the transmission signal is demodulated using the same spreading code that was used for the spreading process, the reference signal is restored back to its original signal level as shown in FIG. 10B. The data signal remains unchanged in signal level, because the data signal is unrelated to the spreading code. If an appropriate spreading ratio is used, the signal level of the of the reference signal occupying a portion of the transmission signal is sufficiently small to that of the data signal. Therefore, the S/N ratio of the data signal is not deteriorated in the reception of the data signal. There is no problem with the reception of the reference signal, because the reference signal is sufficiently large relative to the data signal subsequent to the despreading process. Specifically, when the bandwidth of the data signal is 6 MHz (corresponding to the bandwidth of a television signal channel) and the bandwidth of the reference signal is 6 kHz, the reference signal is spread over a bandwidth of 6 MHz at a spreading ratio of 1000. If the overall power of the reference signal is now one-hundredth the power of the data signal, a resulting S/N ratio is 20 dB, because the reference signal is spread over the same bandwidth as that of the data signal. When the reference signal is demodulated, the power spectrum density of the reference signal is increased by 1000 times, but the power spectrum density of the data signal remains unchanged. If a filter having a bandwidth corresponding to that of the reference signal is used, a resulting S/N ratio is 1000×0.01: 1, i.e., 10 dB. Both S/N ratios work in the demodulation process. Since the reference signal at a low energy level is acceptable, the power consumption for transmitting the reference signal only is also small.

The signal, subsequent to the despreading process, is a narrow band signal corresponding to the primary modulation signal. The frequency of the received signal has to be at a frequency accuracy level matching the primary modulation signal. To demodulate the reference signal by the despreading process, not only accomplishing a phase matching between the PN sequences (i.e., a time synchronization) but also accomplishing a frequency matching (i.e., a frequency synchronization) is required. In other words, if the reference signal is correctly demodulated by shifting the phase of the PN sequence, the frequency of the received signal is accurately aligned with the signal in the receiver.

One example of the radio communications system utilizing the above feature is now discussed, referring to FIG. 11 through FIG. 13. FIG. 11 shows the construction of a hub station. FIG. 13 shows an oscillator 1500, corresponding to the phase-locked oscillator 1200 shown in FIG. 2. In this embodiment, the frequency converter used in the subscriber station is almost the same as the frequency converted shown in FIG. 2, except for the oscillator 1500 that replaces the phase-locked oscillator 1200. The process for the downlink from the hub station to the subscriber station is discussed, and the discussion of the uplink process is omitted here.

Referring to FIG. 11, a transmitter 2001' of the hub station 2000' in this embodiment is different from the transmitter 2001 shown in FIG. 1 as follows: a spread spectrum signal, having the same frequency band as the transmission modulation wave group, is produced by multiplying a predetermined reference signal (having a predetermined bandwidth centered on 700 MHz as represented by a dotted line in FIG. 12) by a PN sequence and is overlapped on the transmission modulation wave group. The construction of the transmitter 2001' subsequent to this process is almost identical to that of the transmitter 2001 shown in FIG. 1. The transmission modulation wave group with the spread spectrum reference signal overlapped thereon has a frequency band of 500 to 900 MHz, as shown in FIG. 12, and is mixed with a 22.1 GHz local-oscillation frequency LO(Hub) signal, thereby resulting in a radio frequency RF(Hub) signal in a frequency band of 22.6 GHz to 23.0 GHz.

In this radio communications system, the radio frequency signal in the frequency band of 22.6 to 23.0 GHZ shown in FIG. 12, transmitted from the hub station 2000', is received by the receiving antenna 1001 of the subscriber station (see FIG. 2). The construction of the frequency converter of the subscriber station in this embodiment is almost identical to the frequency converter shown in FIG. 2, except for the local oscillator 1500 (shown in FIG. 13) that replaces the phase-locked oscillator 1200. The process before the local oscillator 1500 is now briefly discussed referring to FIG. 2.

Out of the radio waves received through the receiving antenna 1001, the signal having the radio frequency band RF(RX) of 22.6 GHZ to 23.0 GHZ is extracted by the bandpass filter 1002. The radio frequency RF(RX) signals, extracted by the bandpass filter 1002, are amplified to an appropriate amplitude by the low-noise amplifier 1003, and are then mixed with the TX/RX local-oscillation frequency (subscriber station local-oscillation frequency) LO1 signal, for example, a 21.0 GHz signal, by the RX mixer 1004.

The local-oscillation frequency LO1 signal is generated by a local oscillator 1120 employing a dielectric oscillator or the like. The local oscillator 1120 employing a dielectric resonator gives a frequency accuracy of +/−1 MHz or so, and results in a high level phase noise in the vicinity of the carrier, compared with the phase-locked oscillator. For this reason, the local-oscillation frequency LO1 signal contains a frequency drift LO1 drift as large as 1 MHz (see FIG. 14).

The output of the RX mixer 1004 contains the frequency components of the sum of, and the difference between, the radio frequency RF(RX) signal and the local-oscillation frequency LO1 signal. The frequency component of the difference, i.e., the signal, in the intermediate frequency band IF1(RX) of 1.6 GHz to 2.0 GHz, is extracted by the bandpass filter 1005, is then amplified by the amplifier 1006, and is then fed to the RX mixer 1007.

The RX mixer 1007 mixes the signal in the intermediate frequency band IF1(RX) and the local-oscillation frequency LO2 signal, for example, a 1.1 GHz signal, supplied by the phase-locked oscillator 1500 (see FIG. 13).

The output from the RX mixer 1007 contains the frequency components of the sum of, and the difference between, the intermediate frequency IF(RX) signal and the local-oscillation frequency LO2 signal. The frequency component of the difference between both signals, i.e., the intermediate frequency IF2(RX) signal in the range of 500 MHz to 900 MHz, is extracted by the bandpass filter 1008, is amplified by the amplifier 1009, and is then fed to the diplexer 1010 and the phase-locked oscillator 1500.

The intermediate frequency IF1 signal, fed to the RX mixer 1007, contains a frequency drift, as large as 1 MHz or so, derived from the local-oscillation frequency LO1 output from the local oscillator 1120, as shown in FIG. 13. In the frequency converter PFC and the radio communication system, of this embodiment, the frequency drift is compensated for by the local-oscillation frequency LO2 signal output from the phase-locked oscillator 1500.

The phase-locked oscillator 1500 (see FIG. 13) performs the despreading demodulation process by multiplying the input signal in the intermediate frequency band IF2(RX) by the PN sequence (identical to the PN sequence used for spreading the reference signal in the hub station 2000'). The signal resulting from the despreading demodulation process is fed to a signal level detector 1502 through a bandpass filter 1501 (having a bandwidth BIF). The signal level detector 1502 detects the level of the signal. A comparator 1503 compares the signal level detected by the signal level detector 1502 to a predetermined threshold. The threshold is set to be slightly lower than the level of a correctly demodulated reference signal. If the comparator 1503 determines that the signal level detected by the signal level detector 1502 is higher than the threshold, both phase and frequency are correctly synchronized.

When the comparator 1503 determines that the signal level detected by the signal level detector 1502 is higher than the threshold, a search controller 1504 performs a time synchronization process. Specifically, a phase shift controller 1505 determines the output of the comparator 1503 while making the output of the PN sequence generator 1506 lead (or lag) in phase. This determination process is iterated by a count corresponding to the longest PN sequence period. When no synchronization is achieved even after searching one period of the PN sequence, the frequency must suffer from offset (specifically, a frequency drift due to the local-oscillation frequency LO1 output from the local oscillator 1120 occurs in the intermediate frequency band IF1).

A frequency controller 1507 controls a voltage-controlled oscillator 1508 so that the received frequency is lower than the lowest frequency based on the assumption of the maximum frequency offset (to perform signal search from low to high frequency). The local-oscillation frequency LO2 is thus adjusted. A newly obtained signal in the intermediate frequency band IF2(RX) is then subjected to the time synchronization process. When the signal level is not above the threshold in the comparator 1503, the oscillation frequency of the voltage-controlled oscillator 1508 is increased by BIF/2 and the above process is repeated.

The local oscillator 1500 repeats the above process. When the signal level exceeds the threshold in the comparator 1503, the reference signal contained in the signal in the intermediate frequency band IF2(RX) is correctly demodulated, and the intermediate frequency band IF2(RX) is correctly aligned with the transmission frequency band (i.e., 500–900 MHz). In other words, a TX/RX frequency relationship is correctly established.

In the frequency converter and the radio communications system of this embodiment, the frequency drift taking place in the high local-oscillation frequency signal is canceled out without utilizing a frequency band outside the frequency band assigned to the transmission modulation wave group. A high frequency accuracy level is thus achieved. Since a crystal oscillator is not necessary, the construction of the frequency converter is simplified and is made compact. The installation cost and operating cost of the converter are reduced.

The following methods are contemplated to overlap the spread spectrum reference signal onto the data signal (transmission modulation wave group) in the hub station 2000' in the radio communications system of this embodiment: i) the reference signal is overlapped onto each data signal channel (see FIG. 15A), ii) the reference signal is overlapped onto at least one data signal channel (see FIG. 15B), and iii) the reference signal is overlapped, straddling all data signal channels (see FIG. 15C). The above embodiment has been discussed in connection with the method iii) in which the reference signal straddles over all data signal channels as shown in FIG. 15C. Other method or a combination of these methods can be employed.

Methods i) and ii), respectively, shown in FIGS. 15A and 15B, for overlapping the spread spectrum reference signal onto individual data channels are executed when the data signal is modulated. Method iii) shown in FIG. 15C for straddling the spread spectrum reference signal onto all data channels is executed when the frequency conversion is performed after all data channel modulation waves are collected. The demodulation of the reference signal needs to be executed in methods ii) and iii), respectively shown in FIG. 15B and FIG. 15C, when all channel signal are still present (before any particular channel is extracted). In case of method i), shown in FIG. 15A, the demodulation can be executed when a particular channel is extracted. Generally speaking, any signal process is easier to form in a lower frequency region; thus, respectively overlapping the spread spectrum reference signal onto each data signal channel is more advantageous than overlapping the spread spectrum reference signal, to be straddled onto all data channels.

In this embodiment, the frequency conversion is performed using two local-oscillation frequencies LO1 and LO2. Alternatively, the present invention can be applied to a frequency converter employing three or more local-oscillation frequencies.

According to one aspect of the present invention, the phase-locked loop generates the subscriber station local-oscillation signal having the low frequency, of the plurality of local-oscillation signals, based on the intermediate frequency beacon signal, which is generated by mixing the predetermined radio frequency beacon signal with the local-oscillation frequency signal. Even if a frequency offset and a phase noise take place in the subscriber station local-oscillation signal having a high frequency, of the plurality of local-oscillation signals, the frequency offset and the phase noise are compensated for or canceled out when the signal in the first frequency band is mixed with the local-oscillation signal having the low frequency. Specifically, even if the phase-locked loop is used in the frequency converter to generate the low local-oscillation frequency signal only, the frequency offset and the phase noise taking place in the remaining high frequency local-oscillation signals are compensated for or canceled out. A high frequency accuracy thus results. This arrangement reduces the number of bulky, costly and power-consuming phase-locked oscillators, typically used in the quasi millimeter band or the millimeter band. A simplified, compact frequency converter is thus provided, reducing both installation and operating costs. The overall frequency accuracy of the frequency converter, employing the phase-locked loop, is improved. Furthermore, since a frequency multiplier is dispensed with, the spurious characteristics of the frequency converter are improved.

The phase-locked loop generates the local-oscillation signal having the low frequency, of the plurality of local-oscillation signals so that the intermediate frequency beacon signal is synchronized with the signal having the predetermined frequency. Even when a frequency offset and a phase noise take place in a local-oscillation signal having a high frequency, of the plurality of local-oscillation signals, the frequency offset and the phase noise are compensated for or canceled out when the signal in the first frequency band is mixed with the local-oscillation signal having the low frequency, of the plurality of local-oscillation signals.

The phase-locked loop generates the local-oscillation signal having the low frequency, of the plurality of local-oscillation signals, in synchronization with the beacon signal having the intermediate frequency. Even when a frequency offset and a phase noise take place in a local-oscillation signal having a high frequency, of the plurality of local-oscillation signals, the frequency offset and the phase noise are compensated for or canceled out when the signal in the first frequency band is mixed with the local-oscillation signal having the low frequency, of the plurality of local-oscillation signals.

The construction of the receiver part of the frequency converter for converting the radio frequency signal into the intermediate frequency signal is simplified and is made compact. The installation cost and operating cost of the converter are thus reduced.

The construction of the transmitter part of the frequency converter for converting the intermediate frequency signal into the radio frequency signal is simplified and is made compact. The installation cost and operating cost of the converter are thus reduced.

According to another aspect of the present invention, the hub station transmits, to the subscriber station, the radio frequency beacon signal into which the beacon signal having the hub station intermediate frequency and the signal having the hub station local-oscillation frequency are mixed. On the other hand, the subscriber station communicates with the hub station by successively mixing the signal in the first frequency band with the plurality of subscriber station local-oscillation signals having the different subscriber station local-oscillation frequencies. The phase-locked loop generates a subscriber station local-oscillation signal having a low frequency, of the plurality of subscriber station local-oscillation signals, based on the intermediate frequency beacon signal, which is generated by mixing the predetermined radio frequency beacon signal with the local-oscillation frequency signal. Therefore, even when a frequency offset and a phase noise take place in a local-oscillation signal having a high frequency, of the plurality of local-oscillation signals, the frequency offset and the phase noise are compensated for or canceled out when the signal in the first frequency band is mixed with the local-oscillation signal having the low frequency. Specifically, even if the phase-locked loop is used in the frequency converter to generate the low local-oscillation frequency signal only, the frequency offset and the phase noise taking place in the remaining high local-oscillation frequency signals are compensated for or canceled out. A high frequency accuracy thus results. This arrangement reduces the number of bulky, costly and power-consuming phase-locked oscillators, typically used in the quasi millimeter band or the millimeter band. A simplified, compact frequency converter is thus provided, reducing both installation and operating costs, and thereby lightening the burden on the subscriber. The overall frequency accuracy of the frequency converter, employing the phase-locked loop, is improved. Furthermore, since a frequency multiplier is dispensed with, the spurious characteristics of the frequency converter are improved.

In the subscriber station, the phase-locked loop generates the subscriber station local-oscillation signal having the low frequency, of the plurality of subscriber station local-oscillation signals so that the beacon signal having the subscriber station intermediate frequency is synchronized with the signal having a predetermined frequency. Even when a frequency offset and a phase noise take place in a subscriber station local-oscillation signal having a high frequency, of the plurality of subscriber station local-oscillation signals, and in the signal in the hub station local-oscillation frequency, the frequency offset and the phase noise are compensated for or canceled out when the signal in the first frequency band is mixed with the subscriber station local-oscillation signal having the low frequency, of the plurality of local-oscillation signals.

The phase-locked loop generates the subscriber station local-oscillation signal having the low frequency, of the plurality of subscriber station local-oscillation signals, in synchronization with the beacon signal having the subscriber station intermediate frequency. Even when a frequency offset and a phase noise take place in a subscriber station local-oscillation signal having a high frequency, of the plurality of subscriber station local-oscillation frequency signals, the frequency offset and the phase noise are compensated for or canceled out when the signal in the first frequency band is mixed with the subscriber station local-oscillation signal having the low frequency, of the plurality of subscriber station local-oscillation signals.

The construction of the receiver part of the subscriber station of the radio communications system for converting the radio frequency signal into the intermediate frequency signal is simplified and is made compact. The installation cost and operating cost of the radio communications system are reduced.

The construction of the transmitter part of the subscriber station of the radio communications system for converting the intermediate frequency signal into the radio frequency signal is simplified and is made compact. The installation cost and operating cost of the radio communications system are reduced.

Since the radio communications system employs the phase-locked loop for the low frequency local-oscillation signal only, the overall frequency accuracy of the system is improved and the utilization of frequencies is improved.

According to another aspect of the present invention, in the frequency converter, the frequency of the local-oscillation signal having the low frequency, of the plurality of local-oscillation signals, is set based on the level of the reference signal that is obtained by despreading the intermediate frequency signal. When the reference signal is correctly despread, the reference signal obtained through the despreading process exceeds a predetermined threshold level. The intermediate frequency then is regarded as being coincident with the transmission frequency when the reference signal is spread. Even when a frequency offset and a phase noise take place in a local-oscillation signal having a high frequency, of a plurality of local-oscillation frequency signals, the frequency offset and the phase noise are compensated for or canceled out, and a high accuracy level of frequency is achieved. Since the reference signal is overlapped in the same frequency band as that of data signal, through the spread spectrum modulation, with almost no effect incurred on the data signal, no band outside the frequency band for the data signal is consumed in a useless fashion, and generally limited frequency bands are efficiently utilized. Since there is no need for crystal oscillators or the like, a simple and compact design may be promoted further, and the installation and operating costs of the converter are reduced.

The construction of the receiver part of the frequency converter for converting the radio frequency signal into the intermediate frequency signal is simplified and is made compact. The installation cost and operating cost of the converter are reduced.

The construction of the transmitter part of the frequency converter for converting the intermediate frequency signal into the radio frequency signal is simplified and is made compact. The installation cost and operating cost of the converter are reduced.

According to yet another aspect, in the radio communications system, the hub station transmits, to the subscriber station, the spread spectrum signal that is obtained by subjecting the predetermined reference signal to the spread spectrum process, and by mixing the spread spectrum reference signal with the hub station local-oscillation frequency signal. To communicate with the hub station, the subscriber station converts the signal in the first frequency band to the signal in the second frequency band, by successively mixing the signal in the first frequency band with the plurality of subscriber station local-oscillation signals having the different frequencies. In the frequency conversion process, the subscriber station local-oscillation signal having the low frequency, of the plurality of subscriber station local-oscillation signals, is set in frequency so that the level of the reference signal that is obtained by despreading the subscriber station intermediate frequency signal exceeds a predetermined threshold. When the reference signal is correctly despread, the reference signal obtained through the despreading process exceeds the predetermined threshold level. The subscriber station intermediate frequency then is regarded as being coincident with the transmission frequency when the reference signal is spread. Even when a frequency offset and a phase noise take place in a subscriber station local-oscillation signal having a high frequency, of a plurality of local-oscillation signals, the frequency offset and the phase noise are compensated for or canceled out, and a high accuracy level of frequency is achieved. Since the reference signal is overlapped in the same frequency band as that of data signal, through the spread spectrum modulation, with almost no effect incurred on the data signal, no band outside the frequency band for the data signal is consumed in a useless fashion, and generally limited frequency bands are efficiently utilized. Since there is no need for crystal oscillators or the like, a simple and compact design may be promoted further, and the installation and operating costs of the converter are reduced.

The construction of the receiver part of the subscriber station of the radio communications system for converting the radio frequency signal into the intermediate frequency signal is simplified and is made compact. The installation cost and operating cost of the radio communications system are reduced.

The construction of the transmitter part of the subscriber station of the radio communications system for converting the intermediate frequency signal into the radio frequency signal is simplified and is made compact. The installation cost and operating cost of the radio communications system are reduced.

Since the radio communications system employs the phase-locked loop for the low local-oscillation frequency signal only, the overall frequency accuracy of the system is improved and the utilization of frequencies is improved.

What is claimed is:

1. A radio frequency converter for converting a signal in a first frequency band to a signal in a second frequency band by successively mixing the signal in the first frequency band with a plurality of local-oscillation signals having different frequencies, the frequency converter comprising an LC oscillator for providing a first one of the local-oscillation signals in a quasi millimeter bandwidth or a millimeter bandwidth; and a phase-locked loop, wherein the phase-locked loop generates at least a second one of the local-oscillation signals having a lowest frequency among the plurality of local-oscillation signals, based on an intermediate frequency beacon signal, which is generated by mixing a predetermined radio frequency beacon signal generated from the signal in a first frequency band with the first local-oscillation signals and wherein the first frequency band and the second frequency band fall in a quasi millimeter bandwidth or a millimeter bandwidth.

2. A frequency converter according to claim 1, wherein the phase-locked loop generates the local-oscillation signal having the low frequency, of the plurality of local-oscillation signals so that a difference between the frequency of the intermediate frequency beacon signal and a predetermined reference frequency becomes zero.

3. A frequency converter according to claim 1, wherein the phase-locked loop generates the local-oscillation signal having the low frequency, of the plurality of local-oscillation signals so that the intermediate frequency beacon signal is synchronized with a signal having a predetermined frequency.

4. A frequency converter according to claim 1, wherein the phase-locked loop synchronizes the local-oscillation signal having the low frequency, of the plurality of local-oscillation signals, with the intermediate frequency beacon signal.

5. A frequency converter according to claim 1, wherein the signal in the first frequency band is a radio frequency signal while the signal in the second frequency band is an intermediate frequency signal.

6. A frequency converter according to claim 1, wherein the signal in the first frequency band is an intermediate frequency signal while the signal in the second frequency band is a radio frequency signal.

7. A radio communications system comprising a hub station and at least one subscriber station radio linked to the hub station, wherein
the subscriber station communicates with the hub station by converting a signal in a first frequency band to a signal in a second frequency band by successively mixing the signal in the first frequency band with a plurality of subscriber station local-oscillation signals having different frequencies,
the hub station transmits, to the subscriber station, a beacon signal having a radio frequency that is generated by mixing a signal having a hub station local-oscillation frequency with a beacon signal having a predetermined hub station intermediate frequency, and
the subscriber station comprises an LC oscillator for providing a first one of the subscriber station local-oscillation signals in a quasi millimeter bandwidth or a millimeter bandwidth; and a phase-locked loop,
wherein the phase-locked loop generates at least one of the subscriber station local-oscillation signals having a lowest frequency among the plurality of local-oscillation signals, based on an intermediate frequency beacon signal, which is generated by mixing the radio frequency beacon signal with another one of the subscriber station local-oscillation signals, and
wherein the first frequency band and the second frequency band fall in a quasi millimeter bandwidth or a millimeter bandwidth.

8. A radio communications system according to claim 7, wherein the phase-locked loop generates the subscriber station local-oscillation signal having the low frequency, of the plurality of subscriber station local-oscillation signals so that a difference between the frequency of the subscriber station intermediate frequency beacon signal and a predetermined reference frequency becomes zero.

9. A radio communications system according to claim 7, wherein the phase-locked loop generates the subscriber station local-oscillation signal having the low frequency, of the plurality of subscriber station local-oscillation signals so that the subscriber station intermediate frequency beacon signal is synchronized with a signal having a predetermined frequency.

10. A radio communications system according to claim 7, wherein the phase-locked loop synchronizes the subscriber station local-oscillation signal having the low frequency, of the plurality of subscriber station local-oscillation signals, with the subscriber station intermediate frequency beacon signal.

11. A radio communications system according to claim 7, wherein the signal in the first frequency band is a radio frequency signal while the signal in the second frequency band is an intermediate frequency signal.

12. A radio communications system according to claim 7, wherein the signal in the first frequency band is an intermediate frequency signal while the signal in the second frequency band is a radio frequency signal.

13. A radio communications system according to claim 7, wherein a predetermined frequency range used by the hub station and the subscriber station is divided into a plurality of frequency channels.

14. A radio frequency converter for converting a signal in a first frequency band which is above a predetermined radio frequency to a signal in a second frequency band which is above the predetermined radio frequency by successively mixing the signal in the first frequency band with a plurality of local-oscillation signals having different frequencies, the frequency converter comprising an LC oscillator for providing a first one of the local-oscillation signals in a quasi millimeter bandwidth or a millimeter bandwidth; and a phase-locked loop,
wherein a spread spectrum reference signal having a predetermined frequency and the first local-oscillation frequency signal are mixed into an intermediate frequency signal which is despread to result in a reference signal,
wherein based on the reference signal, the phase-locked loop generates at least a second one of the local-oscillation signals having a lowest frequency among the plurality of local-oscillation signals having the different frequencies is generated, and
wherein the first frequency band and the second frequency band fall in a quasi millimeter bandwidth or a millimeter bandwidth.

15. A frequency converter according to claim 14, wherein the frequency of the local-oscillation signal having the low frequency, of the plurality of local-oscillation signals, is determined based on the level of the reference signal that is obtained by despreading the intermediate frequency signal.

16. A frequency converter according to claim 14, wherein the signal in the first frequency band is a radio frequency signal while the signal in the second frequency band is an intermediate frequency signal.

17. A frequency converter according to claim 14, wherein the signal in the first frequency band is an intermediate frequency signal while the signal in the second frequency band is a radio frequency signal.

18. A radio communications system comprising a hub station and at least one subscriber station radio linked to the hub station, wherein the subscriber station communicates with the hub station by converting a signal in a first frequency band which is above a predetermined radio frequency to a signal in a second frequency band which is above the predetermined radio frequency by successively mixing the signal in the first frequency band with a plurality of subscriber station local-oscillation signals having different frequencies,
the hub station transmits, to the subscriber station, a spread spectrum signal that is generated by spreading a predetermined reference signal and then by mixing a hub station local-oscillation frequency signal with the spread spectrum reference signal, and
the subscriber station comprises an LC oscillator for providing a first one of the subscriber station local-oscillation signals in a quasi millimeter bandwidth or a millimeter bandwidth; and a phase-locked loop,
wherein the phase-locked loop generates at least a second one of the subscriber station local-oscillation signal having a lowest frequency among the plurality of subscriber station local-oscillation signals used in the subscriber station from a reference signal that is obtained by despreading a subscriber station intermediate frequency signal which results from mixing the spread spectrum signal transmitted from the hub station and the first subscriber station local-oscillation frequency signal, and wherein the first frequency band and the second frequency band fall in a quasi millimeter bandwidth or a millimeter bandwidth.

19. A radio communications system according to claim 18, wherein the frequency of the subscriber station local-oscillation signal having the low frequency, of the plurality of subscriber station local-oscillation signals, is determined based on the level of the reference signal that is obtained by despreading the intermediate frequency signal.

20. A radio communications system according to claim 18, wherein the signal in the first frequency band is a radio frequency signal while the signal in the second frequency band is an intermediate frequency signal.

21. A radio communications system according to claim 18, wherein the signal in the first frequency band is an intermediate frequency signal while the signal in the second frequency band is a radio frequency signal.

22. A radio communications system according to claim 18, wherein a predetermined frequency range used by the hub station and the subscriber station is divided into a plurality of frequency channels.

* * * * *